April 17, 1956 J. D. DURKEE 2,742,532
PRINTER FOR COMMUNICATIONS SYSTEMS
Filed Sept. 11, 1952 15 Sheets-Sheet 1
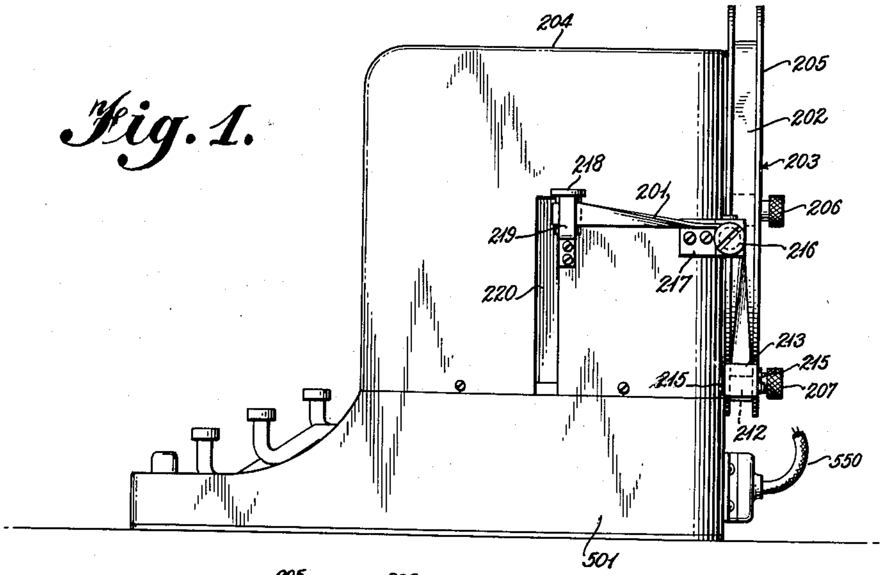
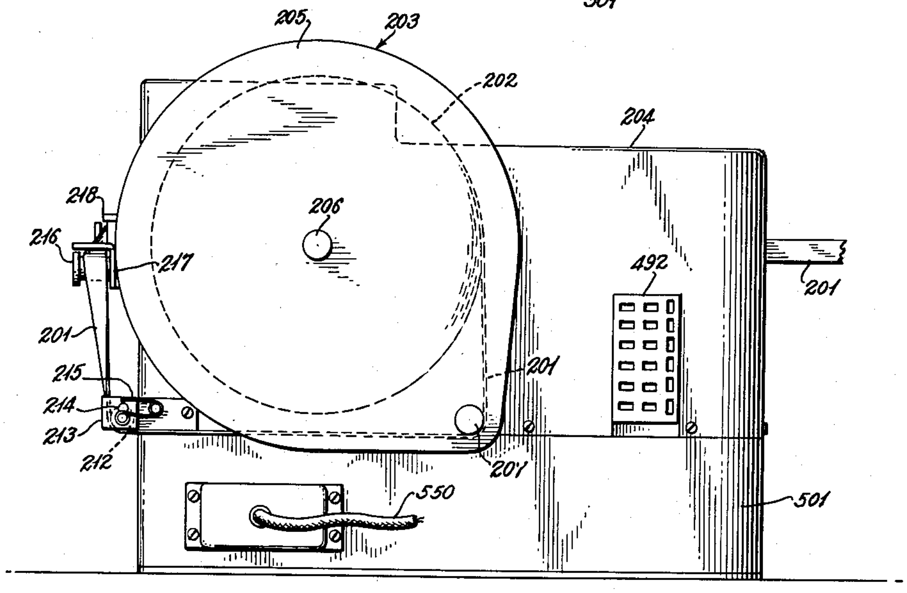
Fig. 2.
INVENTOR
James D. Durkee
BY Burns, Doane & Benedict
ATTORNEYS INVENTOR
James D. Durkee
BY Burns, Doane & Benedict
ATTORNEYS INVENTOR
James D. Durkee
BY Burns, Doane & Benedict
ATTORNEYS INVENTOR
James D. Durkee
BY Burns, Doane & Benedict
ATTORNEYS

PRINTER FOR COMMUNICATIONS SYSTEMS

Filed Sept. 11, 1952

15 Sheets-Sheet 5

INVENTOR

James D. Durkee

BY Burns, Doane & Benedict

ATTORNEYS

April 17, 1956 J. D. DURKEE 2,742,532

PRINTER FOR COMMUNICATIONS SYSTEMS

Filed Sept. 11, 1952 15 Sheets-Sheet 6

INVENTOR

James D. Durkee

BY Burns, Doane & Benedict

ATTORNEYS

April 17, 1956 J. D. DURKEE 2,742,532

PRINTER FOR COMMUNICATIONS SYSTEMS

Filed Sept. 11, 1952 15 Sheets-Sheet 7

INVENTOR

James D. Durkee

BY Burns, Doane & Benedict

ATTORNEYS

INVENTOR
James D. Durkee
BY Burns, Doane & Benedict
ATTORNEYS

April 17, 1956 J. D. DURKEE 2,742,532

PRINTER FOR COMMUNICATIONS SYSTEMS

Filed Sept. 11, 1952 15 Sheets-Sheet 9

INVENTOR

James D. Durkee

BY Burns, Doane & Benedict

ATTORNEYS

INVENTOR

James D. Durkee

BY Burns, Doane & Benedict

ATTORNEYS

PRINTER FOR COMMUNICATIONS SYSTEMS

Filed Sept. 11, 1952 15 Sheets-Sheet 11

INVENTOR

James D. Durkee

BY Burns, Doane & Benedict

ATTORNEYS

April 17, 1956 J. D. DURKEE 2,742,532

PRINTER FOR COMMUNICATIONS SYSTEMS

Filed Sept. 11, 1952 15 Sheets-Sheet 12

INVENTOR

James D. Durkee

BY Burns, Doane & Benedict

ATTORNEYS

April 17, 1956 J. D. DURKEE 2,742,532

PRINTER FOR COMMUNICATIONS SYSTEMS

Filed Sept. 11, 1952 15 Sheets-Sheet 13

INVENTOR

James D. Durkee

BY Burns, Doane & Benedict

ATTORNEYS

INVENTOR
James D. Durkee
BY Burns, Doane & Benedict
ATTORNEYS

April 17, 1956 J. D. DURKEE 2,742,532

PRINTER FOR COMMUNICATIONS SYSTEMS

Filed Sept. 11, 1952 15 Sheets-Sheet 15

INVENTOR

James D. Durkee

BY Burns, Doane + Benedict

ATTORNEYS 2,742,532

PRINTER FOR COMMUNICATIONS SYSTEMS

James D. Durkee, Arlington, Va., assignor, by direct and mesne assignments, to Dualex Corporation, a corporation of Delaware Application September 11, 1952, Serial No. 309,033

19 Claims. (Cl. 178—39)

The present invention relates to a printer for a communications system and to means for generating and transmitting signals for actuating such a printer.

Apparatus embodying the invention includes a plurality of tone generators, each of which generates a tone of a different frequency. A plurality of switches are provided for connecting the tone generators to a transmitter or line amplifier. Operation of a keyboard effects closing of one or more of the switches to connect one or more of the tone generators to the transmitter or amplifier. A different switch or a different combination of switches will be closed for each character which is to be transmitted.

A carrier wave having one or more of the tones from the generators superimposed thereon is transmitted either over a line or through the ether. The signal is received at a receiving station and is fed to relay circuits which are individually responsive to the frequencies of the tones which are superimposed on the carrier wave. The relay circuits supply power to actuators which are preferably of the rotary solenoid type. The rotary solenoids function to move a type font to position the desired character thereon in a printing zone. A hammer is then actuated to impress a ribbon and a paper tape against the character in the printing zone to cause the character to be printed on the paper tape. After the character has been printed on the paper tape, the tape and the ribbon are advanced and the type font returns to a neutral position to await reception of a subsequent signal.

One object of my invention is to provide a telegraphic printer system which is compatible with the existing international Baudot code communication system, using existing signal distribution and equipment.

Another object of the invention is to provide a plurality of solenoids or other electrical actuators which co-act with a system of levers for moving a type font to a selected position and for printing a selected character in response to a signal impulse which is representative of the selected character.

Another object of the invention is to provide a printer of the type described which electrically and mechanically factors the received signal into two groups of elements for selectively imparting angular and linear movement to a type font for selectively positioning the appropriate character in a printing zone.

Another object of the invention is to provide an extremely compact and lightweight printing telegraph receiving and transmitting apparatus which is easily portable and which readily lends itself to use in air, land and water vehicles.

Another object of the invention is to provide apparatus of the character described which is simple in design with resultant dependability and low cost.

A further object of the invention is to provide a printing telegraph system which is capable of operation at variable speeds up to a maximum speed which is several times greater than the maximum speed of apparatus heretofore used.

Still another object of the invention is to provide improved means for moving a type font to place the desired character in a printing zone.

A further object of the invention is to provide means for shifting the position of the printing zone so that for any given position of the type font it is possible to print either of two characters.

Another object of the invention is to provide an improved keyboard operated switch closing mechanism for controlling the connection of the tone generators to the transmitter.

Another object of the invention is to provide improved mechanisms for feeding the paper tape and for feeding and reversing the ribbon.

The foregoing and other objects and advantages of the invention will be better understood by reference to the following detailed description and the accompanying drawings wherein:

Figure 1 is an end elevational view of apparatus embodying my invention;

Figure 2 is a rear elevational view of the apparatus shown in Figure 1;

Figure 18:
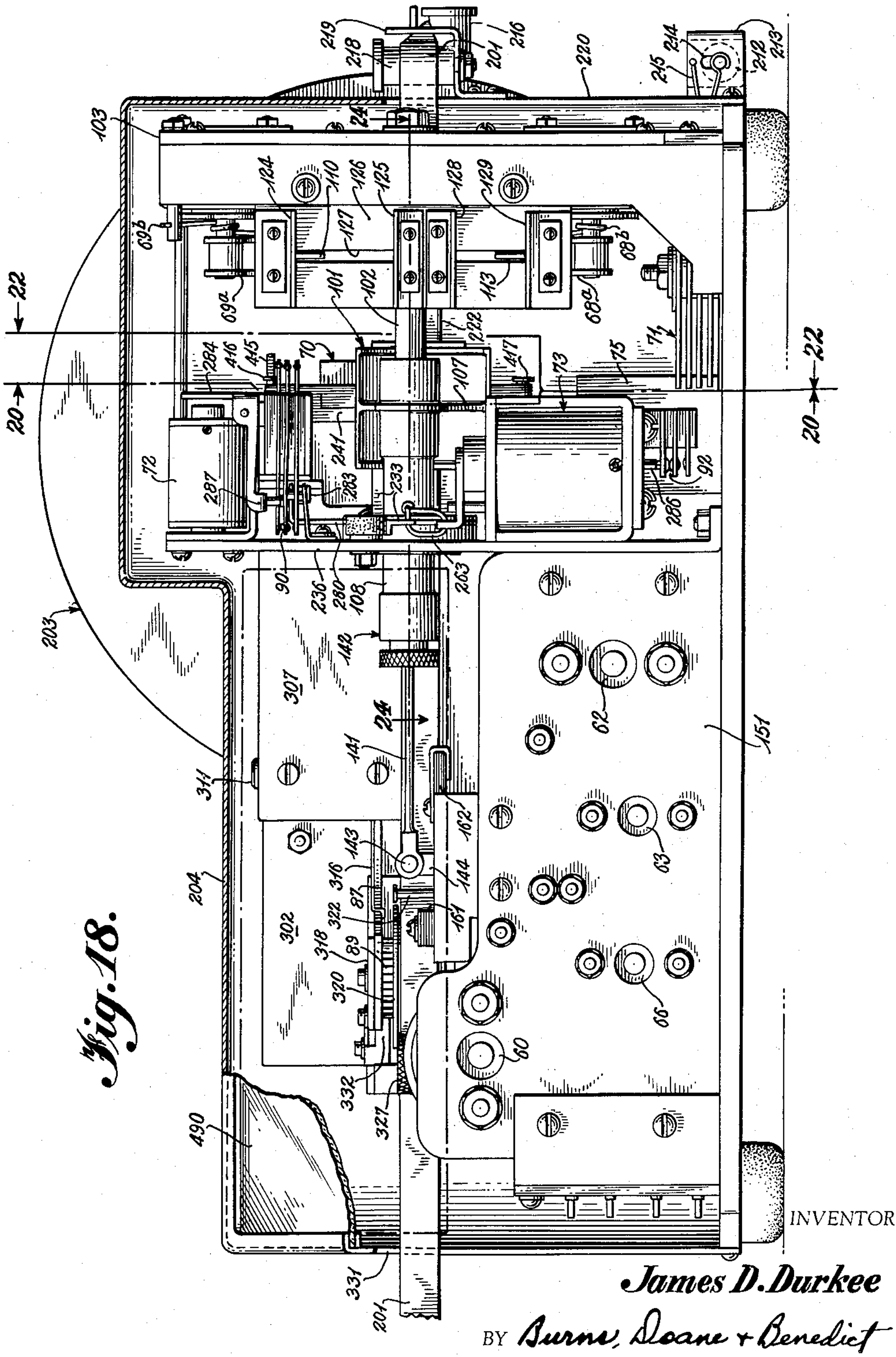
Figure 19:
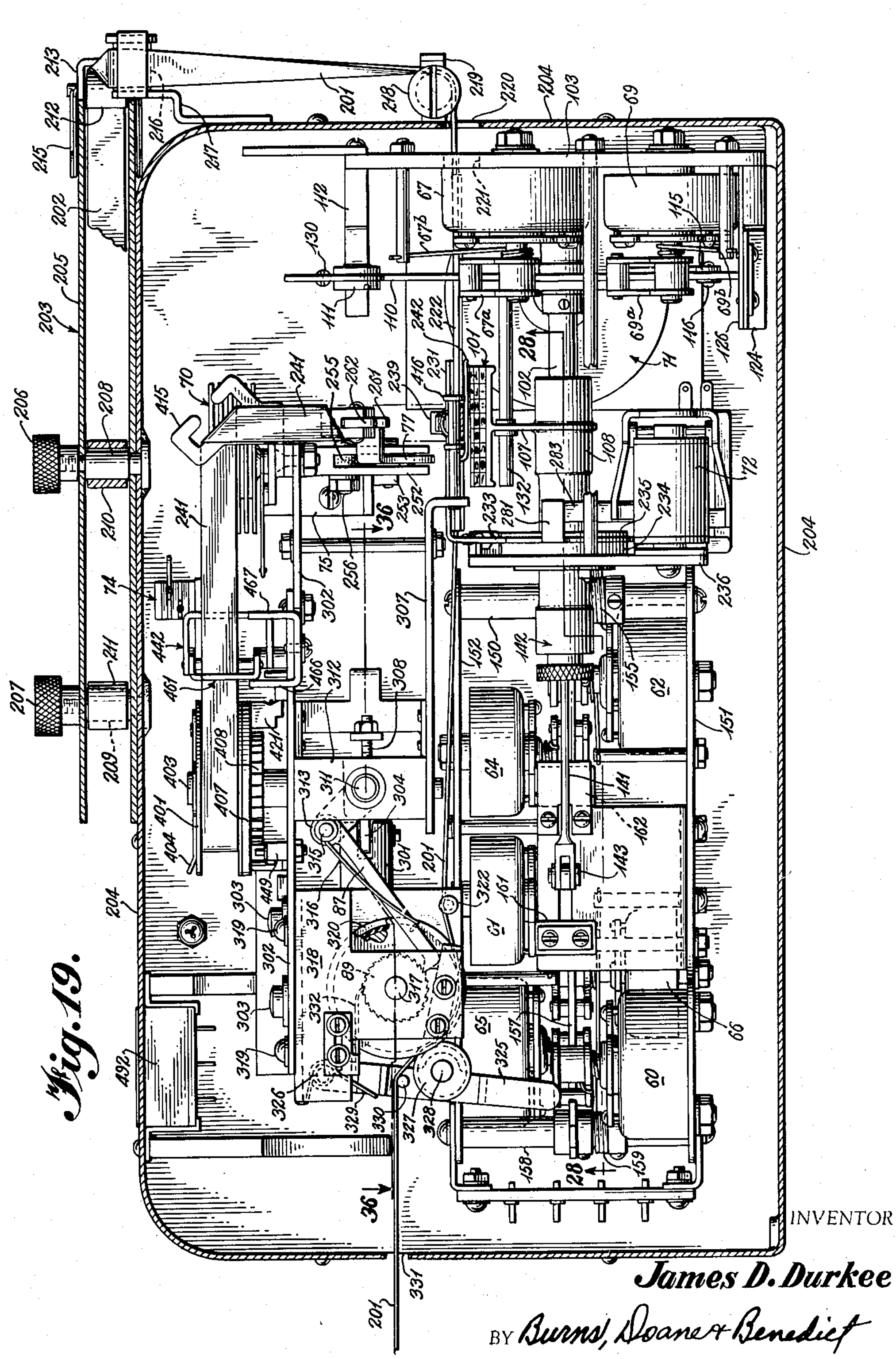
Figure 20:
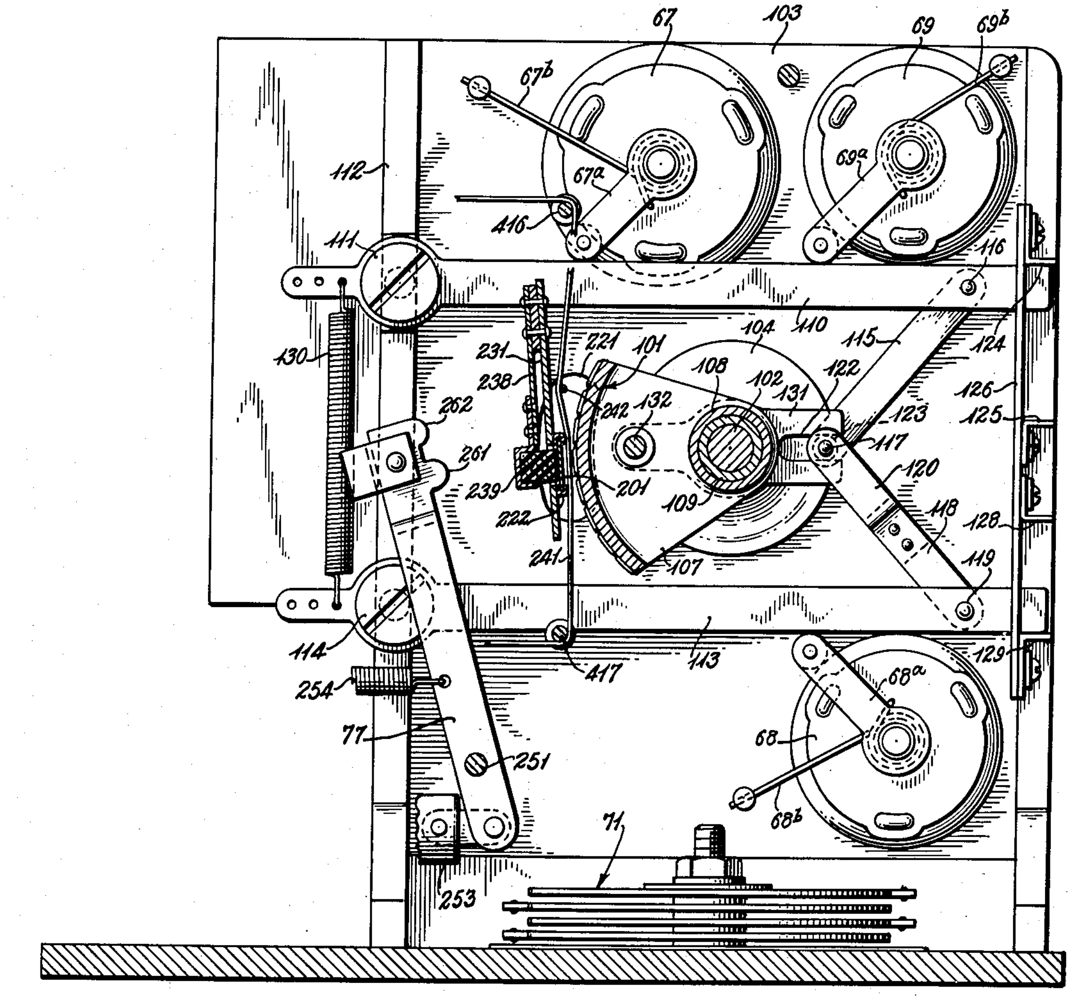
Figure 26:
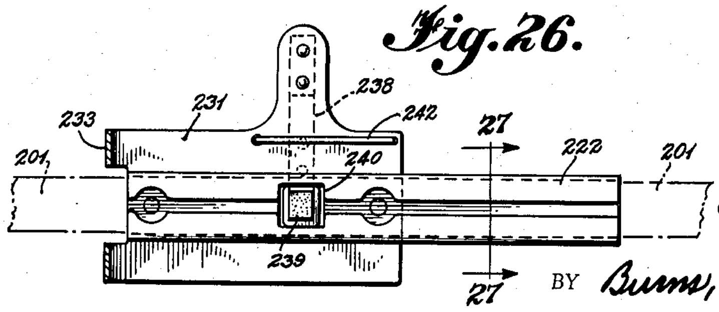
Figure 27:
Figure 21:
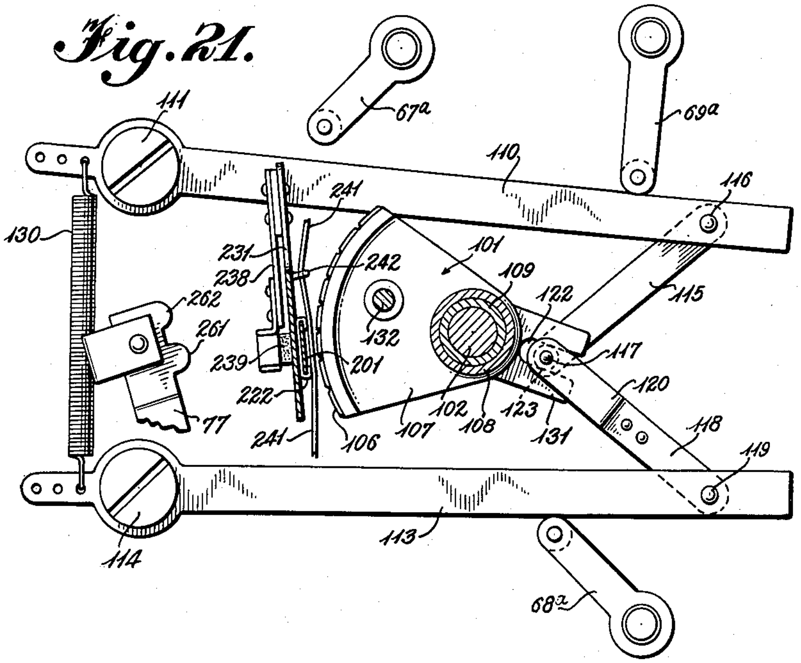
Figures 24, 25:
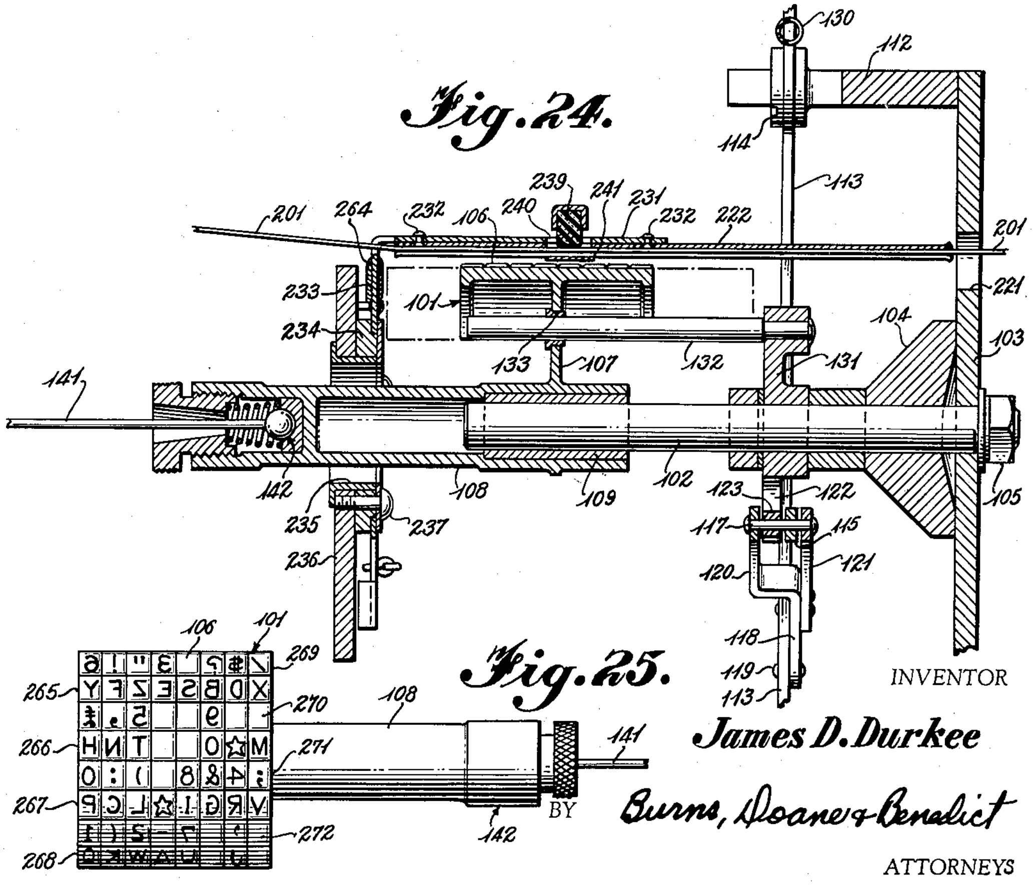
Figure 22:
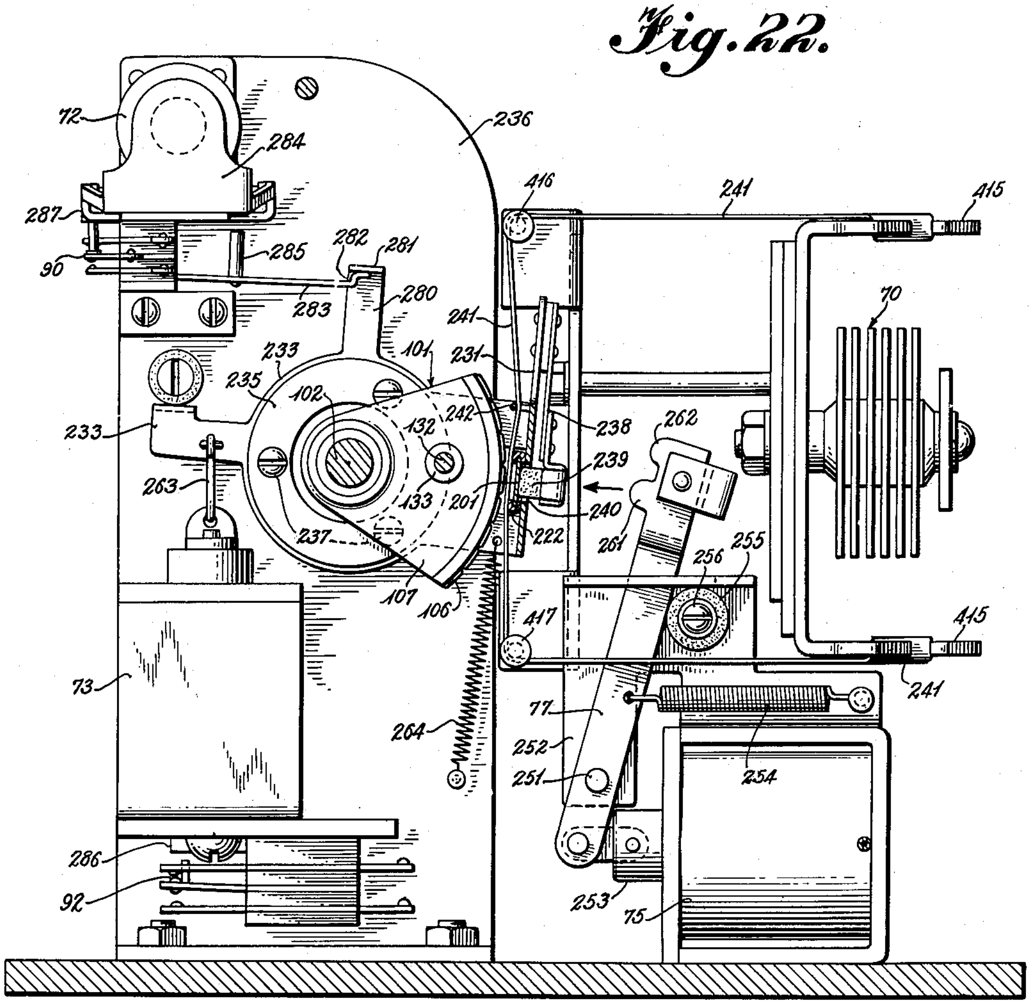
Figure 23:
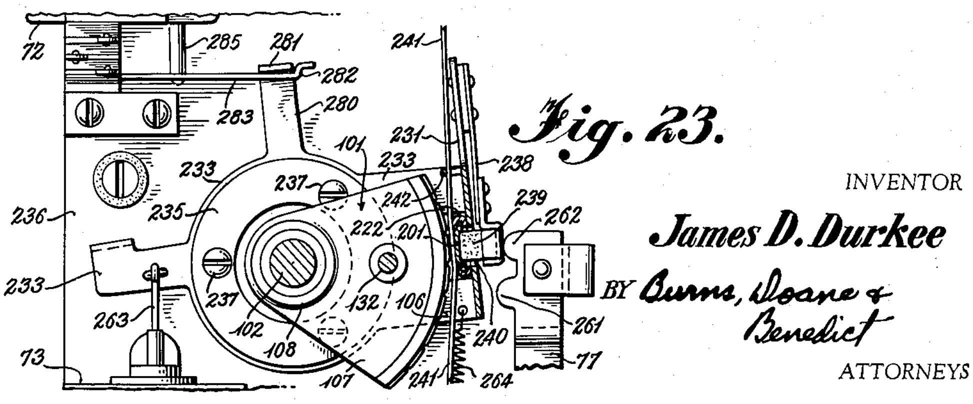
Figure 28:
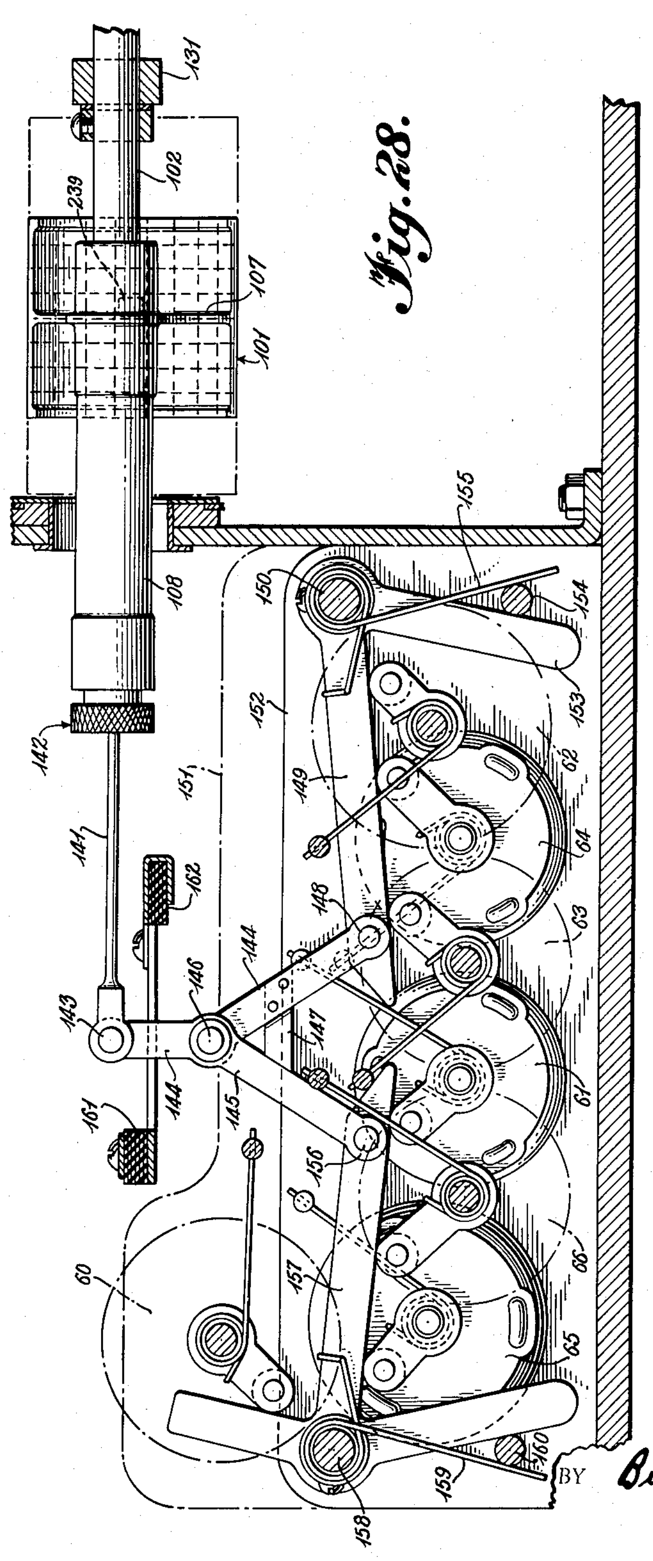
Figures 29, 30:
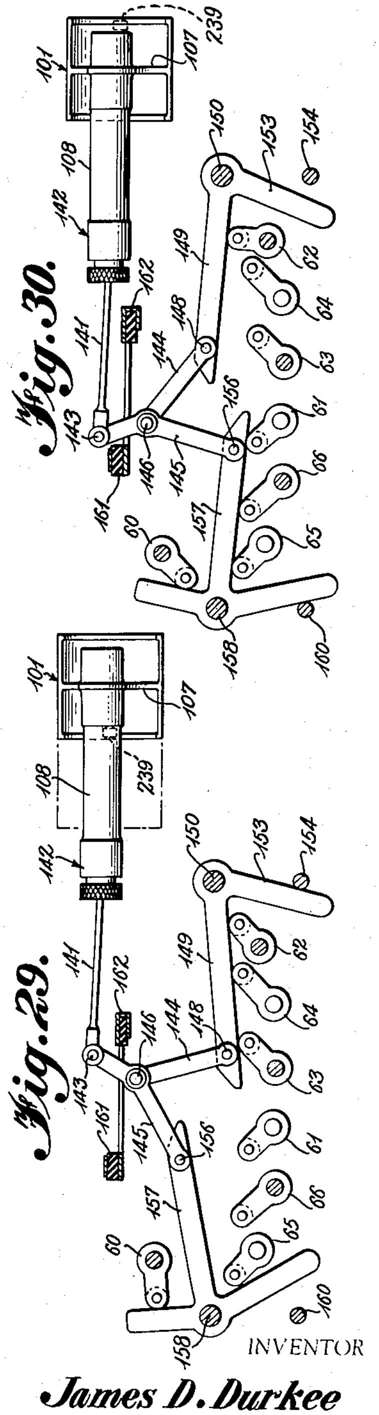
Figures 32, 33, 34, 35:
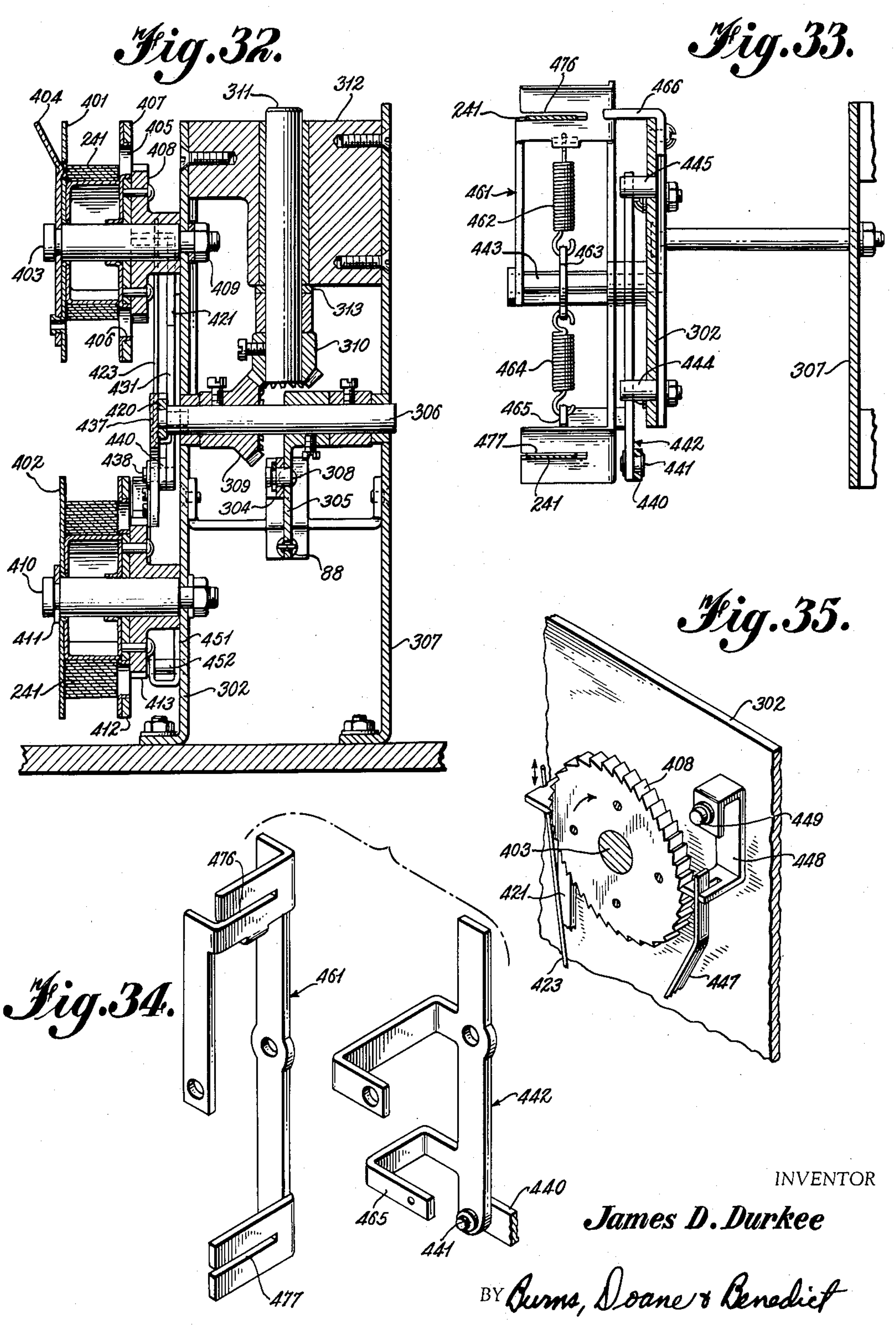
Figure 31:
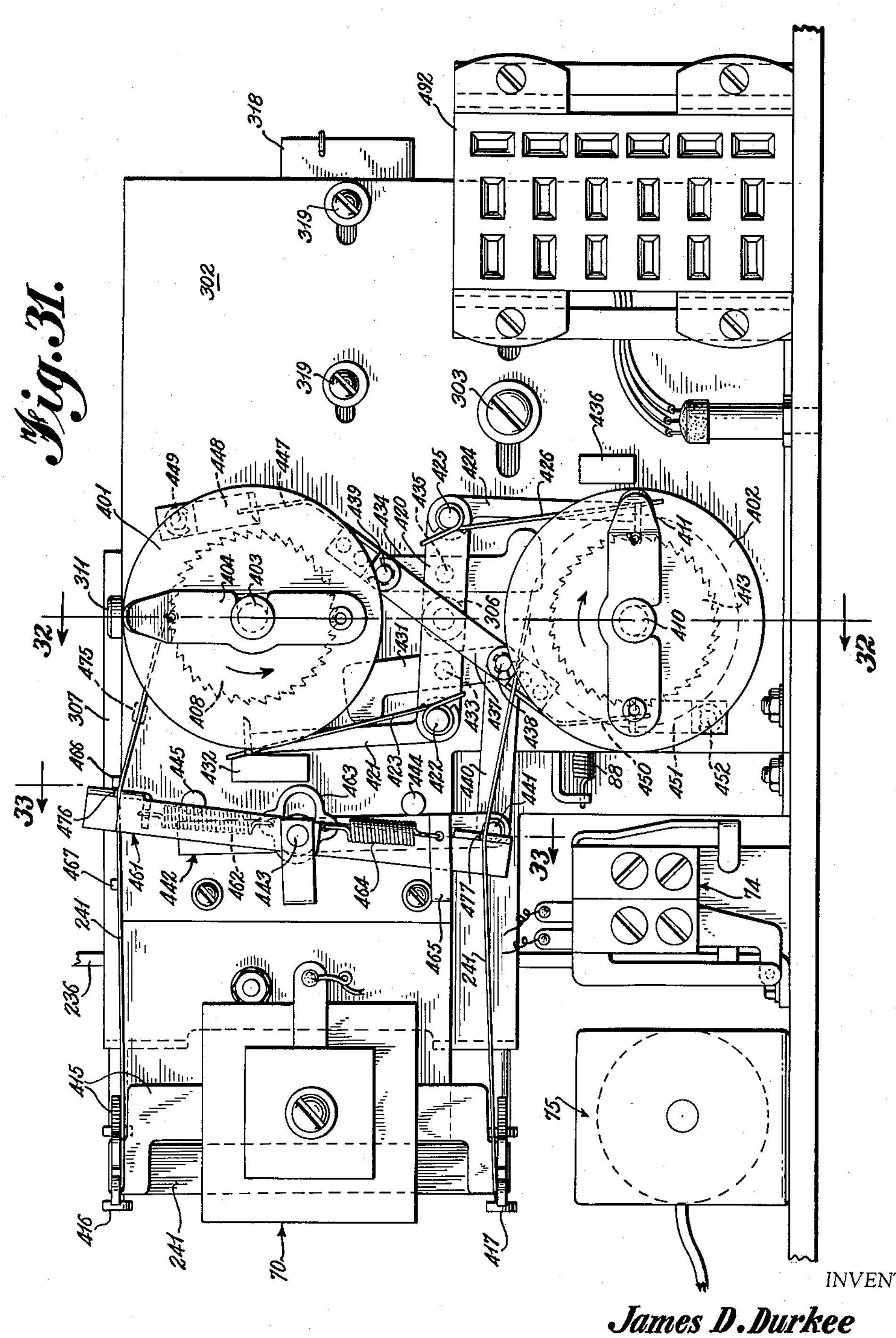
Figures 36, 37:
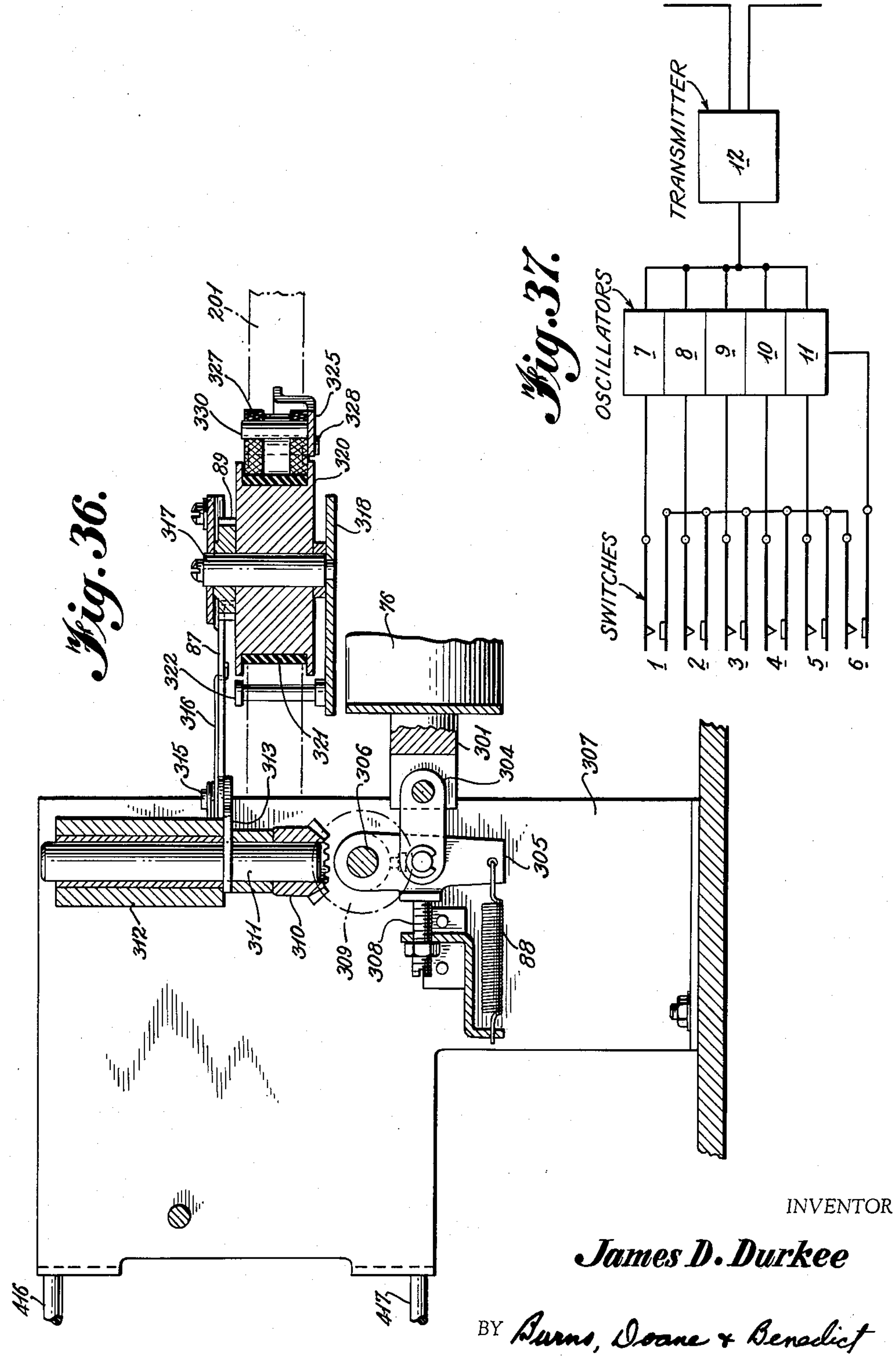
Figure 38:
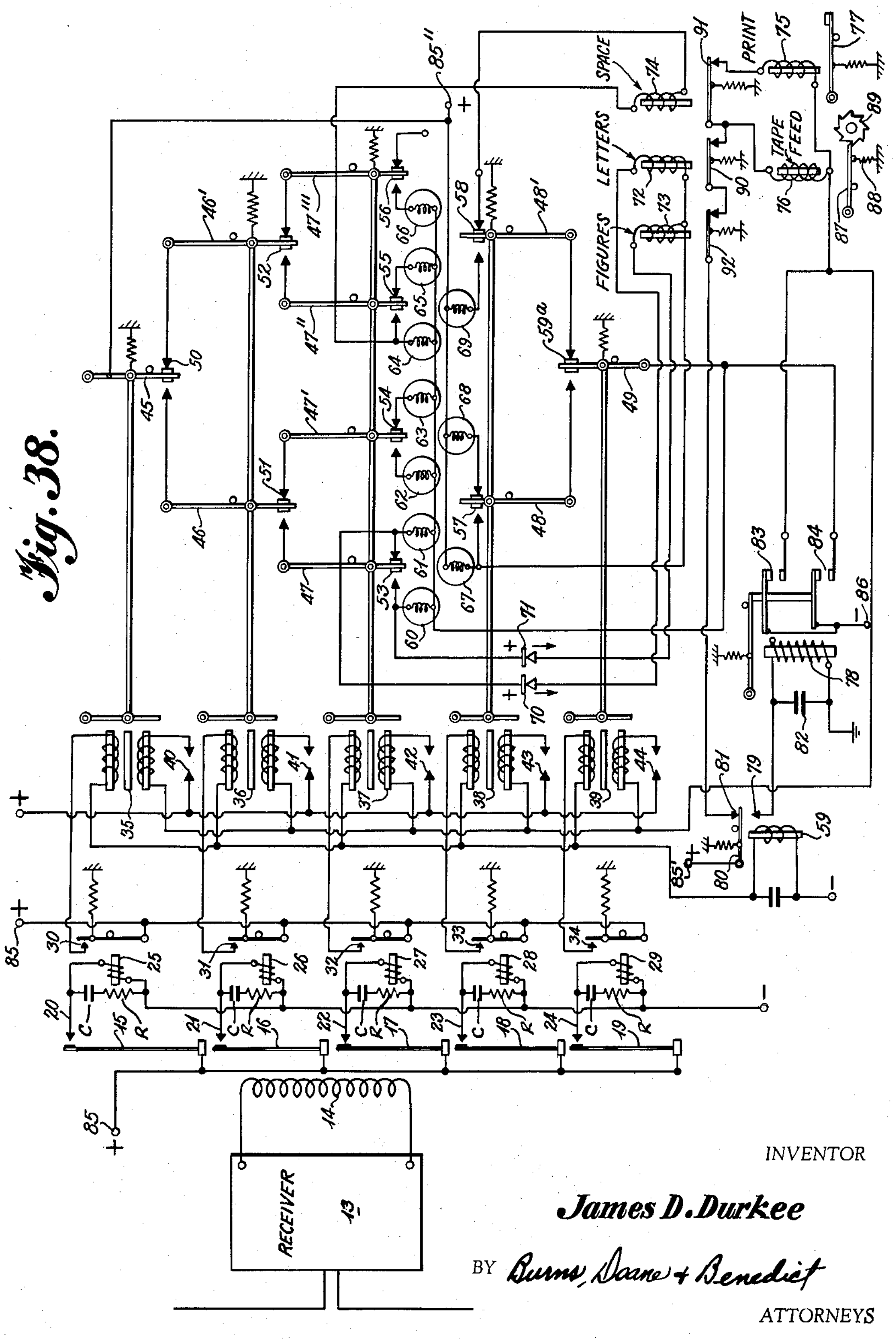

Figures 10 to 17, inclusive, are fragmentary views partly in section and partly in side elevation, showing the pivoted ends of the several key levers and their cooperating relationship with the U-shaped members actuated thereby;

Figure 18 is a front elevational view of the printing portion of the apparatus, portions of the casing being shown broken away or in cross-section;

Figure 19 is a top plan view of the apparatus shown in Figure 18, portions of the casing and tape reel being shown in cross-section;

Figure 20 is a vertical sectional view taken in the direction of the arrows along the line 20—20 of Figure 18;

Figure 21 is a fragmentary view showing portions of the apparatus illustrated in Figure 20, one of the solenoids being actuated with resultant movement of the type font;

Figure 22 is a vertical sectional view taken in the direction of the arrows along the line 22—22 of Figure 18;

Figure 23 is a fragmentary view showing portions of the apparatus illustrated in Figure 22, the printing zone being shown shifted to a position other than that shown in Figure 22;

Figure 24 is a horizontal sectional view taken in the direction of the arrows along the line 24—24 of Figure 18;

Figure 25 is a side elevational view of the type font;

Figure 26 is a view partly in front elevation and partly in cross-section of the tape-supporting mechanism;

Figure 27 is a sectional view taken in the direction of the arrows along the line 27—27 of Figure 26;

Figure 28 is a view partially in side elevation and partially in cross-section of the mechanism for controlling the longitudinal or translatory movement of the type font;

Figure 29 is a fragmentary view showing the apparatus illustrated in Figure 28, one of the solenoids having been energized to effect a translatory movement of the type font to a selected position in one direction from neutral position;

Figure 30 is a view similar to Figure 29, but illustrating a different solenoid as having been energized to effect translatory movement of the type font to another selected position in the opposite direction from neutral position;

Figure 31 is a rear elevational view of the apparatus, the casing being shown removed;

Figure 32 is a vertical sectional view taken in the direction of the arrows along the line 32—32 of Figure 31;

Figure 33 is a vertical sectional view taken in the direction of the arrows along the line 33—33 of Figure 31;

Figure 34 is a perspective view of the elements of the mechanism for effecting reversal of the ribbon feed;

Figure 35 is a fragmentary perspective view of portions of the ribbon-feed mechanism;

Figure 36 is a vertical sectional view taken in the direction of the arrows along the line 36—36 of Figure 19;

Figure 37 is a wiring diagram showing the tone generators, the switches for controlling such generators, and the transmitter; and Figure 38 is a wiring diagram of the receiver, the signal factoring apparatus, and the circuits for controlling energization of the various solenoids of the printer.

*Description of transmitter circuit*

Figure 37 illustrates the transmission system employing a transmitter unit of the five tone system. The switches designated 1, 2, 3, 4 and 5 are operated by the switch bars hereinafter described. Switch 6 is the common return for switches 1, 2, 3, 4 and 5 and insures simultaneous application of all tones of a combination to the transmission circuit.

Reference characters 7, 8, 9, 10 and 11 represent audio frequency tone generators or oscillators, the common or combined outputs of which are fed to a radio transmitter or line amplifier 12 which in turn radiates the combined tones on a carrier frequency into space or to a line.

The assignment of positions of the switches in respect to the code elements is in accord with the International five unit teleprinter code. For instance, a combination of switches 1, 3 and 5 represents the latter Y and a combination of switches 2 and 4 represents the letter R. Thus this system of transmission can be compatible with existing sequentially operated systems by storing the incoming sequential impulses and applying them simultaneously to my system during the time occupied by the start and stop periods of the sequential system, or by using a conventional perforated tape transmitter and replacing the switches 1, 2, 3, 4 and 5 of the system described herein with the contacts of the tape transmitter.

*Operation of the transmitter circuit*

When the letter "Y" key of a keyboard is depressed, switches 1, 3, 5 and 6 are closed in a manner hereinafter described, thus connecting tone generators 7, 9, and 11 to the transmitter 12, which causes a radio frequency carrier, modulated by the combined audio frequency tones produced by generators 7, 9, and 11, to be transmitted into space or over a line wire circuit. Similarly, when the letter "R" key is depressed, the switches 2, 4 and 6 are closed, connecting tone generators 8 and 10 to the transmitter 12 for modulating the carrier transmitted thereby.

*Description of receiving system circuit*

The receiving system circuit is shown in Figure 38. It includes a radio receiver or line amplifier 13, the output of which is connected to the driving coil 14 of an assembly of mechanically tuned vibrating reeds 15, 16, 17, 18 and 19 which are resonant with the tones produced by generators 7, 8, 9, 10 and 11, respectively. Such a reed assembly is described and claimed in my copending application, Serial No. 283,626, filed April 22, 1952, entitled "Vibrating Reed Assembly With Damping," now U. S. Patent No. 2,691,749, dated October 12, 1954. The reed contacts 20, 21, 22, 23 and 24, respectively, when closed, operate integrating relays 25, 26, 27, 28 and 29. The capacitors "C" and resistors "R" shunt the coils of relays 25, 26, 27, 28 and 29 for the purpose of storing sufficient energy to keep the relays closed during that period of a vibrating cycle of the reeds when contacts 20, 21, 22, 23 and 24 are open.

Contacts 30, 31, 32, 33 and 34 of relays 25, 26, 27, 28 and 29, respectively, when closed, operate double coil relays 35, 36, 37, 38 and 39. Contacts 40. 41, 42, 43 and 44 are closed upon energization of relays 35, 36, 37, 38 and 39, respectively, and are for the purpose of locking relays 35, 36, 37, 38 and 39 in a closed position when closed.

Armature 45 is spring biased to the right and is operated by relay 35 to switch contacts 50 from right to left when energized. In a like manner relay 36 controls contacts 51 and 52 through spring biased armatures 46 and 46'; relay 37 controls contacts 53, 54, 55 and 56 through spring biased armatures 47, 47', 47'' and 47'''; relay 38 controls contacts 57 and 58 through spring biased armatures 48 and 48' and relay 39 controls contacts **59*a* through spring biased armature 49**.

Relay 59 is connected in series with the coils of relays 35, 36, 37, 38 and 39, which are controlled by contacts 30, 31, 32, 33 and 34, so that when any one or any combination of these relays is energized relay 59 will be energized to close contacts 79 and 80 and to open contacts 80 and 81.

Rotary solenoids 60, 61, 62, 63, 64, 65, and 66 control the horizontal movement of the printer type font 101 as shown more particularly in Figures 28, 29 and 30 while rotary solenoids 67, 68 and 69 control the angular position of the printer type font 101 as shown in Figures 20 and 21, all as more fully described hereinafter.

Rectifiers 70 and 71 are connected in series with relays 72 and 73, respectively, and limit the current flow to one direction only. Relay 73 operates contacts 92 and relay 72 operates contacts 90 to remove current from tape feed relay 76 and print relay 75, so that these relays will not be operated during the letter or figures function.

The space function relay 74 is connected between contacts 55 and 58 and will be operated when these contacts are in proper position to apply energy to relay 74. Contacts 91 of space relay 74 remove the current from print relay 75 so that this relay will not be operated during the space function.

Print relay 75 operates printing striker arm 77 and tape feed relay 76 ratchets the printer tape and ink ribbon forward at the end of each stroke.

Relay 78 is a circuit breaker relay which acts to unlock the lock coils of relays 35, 36, 37, 38 and 39 and to break the negative return circuit to rotary solenoids 60 to 69, inclusive, as well as to relays 76 and 75 when contacts 79 and 80 of relay 59 have been broken long enough to permit the discharge of condenser 82 across coil of relay 78, which in turn releases contacts 83 and 84.

*Operation of receiving system circuit*

When a signal is emitted by transmitter 12 of Figure 37 containing, for example, the modulated elements of tone generators 7, 9 and 11, which represents the letter Y, and is received by receiver 13 of Figure 38, the signal is demodulated and its combined elements are presented to driving coil 14 of reed relays 15 to 19, inclusive. Since tuned reeds 15, 17 and 19 are resonant with the tones produced by generators 7, 9 and 11, these reeds will vibrate at amplitudes sufficient to cause contacts 20, 22 and 24 to close to energize relays 25, 27 and 29. Contacts 30, 32 and 34 will thus be closed causing relays 35, 37 and 39 to be energized. Contacts 40, 42 and 44 will also be closed causing relays 35, 37 and 39 to be locked closed and armatures 45, 47, 47′, 47″, 47‴ and 49 to be moved to the left (Figure 38). By tracing the path of positive current from source at positive terminal 85″ (at the extreme right in Figure 38), it will be seen that the circuit will now be from positive terminal 85″ through contact 50 (left) to contact 51 (right) to contact 54 (left) to rotary solenoid 62 to negative terminal 86 through contact 84 of relay 78. Relay 78 had been closed when current through relay coils 35, 37 and 39 also passed through relay 59, which caused contacts 80 and 79 to close which in turn energized relay 78 causing contacts 83 and 84 to close. It will also be seen that the circuit from negative terminal 86 through contacts 84, contacts 59*a* (left), contacts 57 (right) to rotary solenoid 68 and thence to positive terminal 85″ has been completed.

The energizing of rotary solenoid 62 moves the type font 101 in a horizontal plane as seen in Figure 30 to the column of four letters containing the letter Y. The energizing of rotary solenoid 68 moves the type font 101 angularly to place the letter Y in front of a tape 201 at a position where the striker arm 77 will strike when relay 75 is energized.

As long as the signal persists, the position described above will be maintained. As soon as the signal ceases, reeds 15, 17 and 19 cease vibrating, breaking contacts 20, 22 and 24 which in turn break contacts 30, 32 and 34 which removes the current from the coils of relay 35, 37 and 39 and from the coil of relay 59. The removal of energy from coil 59 causes contact 80 to break with contact 79 and to make with contact 81 thereby causing positive current from source 85′ to be connected through relays 75 and 76 to negative terminal 86 via contacts 83. When contacts 79 and 80 are broken and energy from positive terminal 85′ to coil 78 is removed, contacts 83 and 84 do not immediately break, but remain closed for a short interval of time until condenser 82 has discharged to a level which will no longer hold contacts 83 and 84 closed. This interval is sufficient, however, to permit relays 75 and 76 to operate.

When relay 75 operates, striker arm 77 strikes the tape 201 and the ribbon in front of the type font on which the letter "Y" has been positioned as described above. Relay 76 is activated simultaneously with relay 75 and causes ratchet arm 87 to be drawn back and energy stored in spring 88, which upon breaking of current through relay 76, causes ratchet arm 87 to move ratchet wheel 89 one step forward, advancing the tape and linked ribbon one step.

When the energy stored in condenser 82 is dissipated and contacts 83 and 84 are opened, the negative return lead to the locking coils of relays 35 to 39, inclusive, is broken through contacts 83 and the negative return lead to the rotary solenoids is broken through contacts 84. Thus the system is restored to its original condition and is prepared to receive a new combination of tones.

Had the received combination contained a signal which did not require printing or the movement of tape, such as the "Figure" or "Letter" function, the same process of events would have taken place except that in the case of "Letters," positive current would have been applied to the terminal of rotary solenoid 61, where one terminal of relay 72 is connected, and negative current applied to the terminal of rotary solenoid 67 to which the other terminal of relay 72 is connected. Thus relay 72 would be operated to perform the letter function. When relay 72 was energized, contacts 90 were opened, thus upon the cessation of the incoming signal and the return of contact 80 to contact 81, no circuit would exist to relays 75 and 76 and, therefore, the system would clear without the printing or tape advance functions being performed.

The function of rectifiers 70 and 71 is to prevent the leakage of current from solenoid 67 back to solenoids 60 or 61 when solenoid 67 is to be operated not in conjunction with solenoids 60 and 61.

In the case of the "Figure" and "Space" functions, the circuit may be easily traced, as in the manner of the "Letter" function, except in the case of "Space" the contacts 91 prevent the operation of the print relay 75 but permit tape feed relay 76 to operate.

The electrical circuits are disclosed in my copending application Serial No. 300,485 (now abandoned), filed July 23, 1952, entitled "Printing Telegraph System" of which this application is a continuation-in-part.

*Motion of the type font*

The motion of the type font is one in which time of operation is conserved to a maximum extent. The possible permutations and combinations of the Baudot code, utilized in the system of my invention, are established by the formula:

$$C=2^5=32$$

where C is the number of combinations possible. The electrical circuit and the mechanism of my invention operate to first divide the number of combinations into two groups, one group consisting of eight elements and the other group consisting of four elements. The mechanism further subdivides the eight group elements into four possible movements of the type font in one direction from a base or neutral position and three possible movements in the opposite direction from the base position. The four element group is divided into two angular positions in one direction from a base position and one angular position in the opposite direction from the base position. The only movements ever required of the type font to reach any of its thirty-two positions thus consists of a single horizontal movement and a single vertical movement. The extent of the horizontal movement will never exceed four character positions from the neutral or base position of the font, and the extent of angular movement will never exceed two character positions from the base position. Upper and lower case in this arrangement is considered as one position. The orientation or movement of the type font may be considered as tri-dimensional inasmuch as the type font is being moved angularly at the same time that it is being moved horizontally. The type font actually moves in a spiral path to a selected position preparatory to the printing of a character. Thus a selected character on the face of the type font may be said to actually move tri-dimensionally.

The rotary solenoids 60 to 69 shown in Figures 20 and 28 cooperate with spring biased lever members for positioning the type font. The type font is designated generally by the reference numeral 101 and is mounted for both angular and longitudinal movement on a fixed shaft 102 which is rigidly supported at one end by means of an end plate 103. A collar 104 is fixed to the shaft 102 and cooperates with a nut 105 to rigidly secure the shaft to the end plate 103. The type font includes an arcuate character bearing portion 106, a web portion 107 and an elongated hub portion 108 which is provided with a bearing member 109 for engagement with the shaft 102.

The angular movements of the type font are controlled by the solenoids 67, 68 and 69 which are best shown in Figures 20 and 21 and which are fixed to the end plate 103. These solenoids are provided with arms 67*a*, 68*a*, and 69*a*, respectively, which, when the solenoids are not energized, occupy the positions shown in Figure 20. When the solenoid 67 is energized, its arm 67*a* rotates approximately 45 degrees in a counterclockwise direction. Similarly, when the solenoid 69 is energized, its arm 69*a* will rotate through approximately 45° in a counterclockwise direction. When the solenoid 68 is energized, its arm 68*a* will rotate through approximately 45° in a clockwise direction. Each of the solenoids is provided with a spring member for the purpose of biasing its arm to the position shown in Figure 20, these spring members being designated by the reference numerals **67*b*, 68*b*, and 69*b***.

The outer ends of the arms **67*a* and 69*a* are provided with rollers which engage the edge of a lever 110 which is pivotally mounted by means of a pin 111 to an upright post 112. The arm 68*a* carries a roller at its outer end which engages the edge of a lever member 113 which is pivotally mounted by means of a pin 114 to the post 112. A link 115 is pivotally connected to the lever 110 at 116 while its opposite end is connected to a bearing pin 117. A bifurcated link 118 is pivotally connected at 119 to the lever member 113. The bifurcated link 118 has legs 120 and 121 which are attached to the ends of the bearing pin 117. A roller 123 is positioned on the pin 117 and this roller lies in a slot 122 in a member 131 which is rotatable on the shaft 102. A type font drive pin 132 is fixed to the member 131 and extends in parallel relationship to the shaft 102. The drive pin 132 extends through an aperture 133 in the web portion 107** of the type font so that the type font may be angularly driven without restricting its longitudinal movement.

Stop members 124 and 125 are adjustably positioned along a guide plate 126 having a slot 127 therein and these stop members serve to limit the extent of movement of the free end of the lever member 110. Similar stop members 128 and 129 are provided for the lever member 113. The lever members 110 and 113 are biased toward their positions shown in Figure 20 by means of a tension spring member 130.

The arcuate character bearing member 106 of the type font is best illustrated in Figure 25. The characters are horizontally and vertically spaced and it will be apparent that in order to position a desired character in a printing zone it will be necessary to impart both angular and longitudinal movement to the type font. It will also be apparent from the foregoing description that energization of any one of the solenoids 67, 68, and 69 will move the type font angularly from the neutral position shown in Figure 20 to a new angular position. Figure 21 illustrates the condition which exists after the solenoid 69 has been energized. Had the solenoid 67 been energized there would have been greater angular motion of the type font in the same direction. Energization of the solenoid 68 would have caused angular movement of the type font in the opposite direction. It is not contemplated that more than one of the solenoids 67, 68, and 69 will be energized at one time.

A somewhat comparable arrangement, as shown in Figures 28, 29, and 30, is provided for controlling the longitudinal movement of the type font 101. A link 141 is connected to the hub portion 108 of the type font by means of a ball and socket joint designated generally by the reference numeral 142. The opposite end of the link 141 is connected by means of a pin 143 to the upper end of a bell crank 144. A link 145 is pivotally connected by means of a pivot pin 146 to an intermediate portion of the bell crank 144. The bell crank 144 has fixed thereto a stop member 147 which serves to limit the extent of movement of the link 145 toward the bell crank 144. The lower end of the bell crank 144 is pivotally connected by means of a pin 148 to a lever member 149, which is pivotally mounted on a horizontal shaft 150 which is supported by a front plate 151 and a middle plate 152. The lever member 149 has a depending extension 153 which engages a stop member 154. The extension 153 is urged into engagement with the stop member 154 by means of a clip spring member 155.

The lower end of the link 145 is pivotally connected by means of a pin 156 to a lever member 157. The lever member 157 is pivotally mounted on a horizontal shaft 158 which is similar to the shaft 150. A spring member 159 biases the lever member 157 into engagement with a stop member 160.

Rotary solenoids, similar to the solenoids 67, 68, and 69 described above, are used to control the positions of the lever members 149 and 157. Solenoids 62 and 63 are mounted on the rear surface of the front plate 151 in position to cooperate with the lever member 149. Solenoid 64 is mounted on the front surface of the middle plate 152 in position to cooperate with the lever member 149. Solenoids 60 and 66 are mounted on the rear surface of the front plate 151 in position to cooperate with the lever member 157. Solenoids 61 and 65 are mounted on the front surface of the middle plate 152.

The arms of the solenoids 60, 61, 65, and 66, which cooperate with the lever member 157, will turn in a clockwise direction as seen in Figure 28, when those solenoids are energized. The solenoids 62, 63, and 64, which cooperate with the lever member 149, will turn in counterclockwise direction, as viewed in Figure 28, when those solenoids are energized. Figure 29 illustrates the condition which exists when the solenoid 60 has been energized. This solenoid is positioned nearest to the shaft 158, about which the lever member 157 pivots and it will be apparent that the type font 101 has been moved the extreme amount to the right. There would have been a lesser extent of movement of the type font to the right had any one of the solenoids 61, 65, or 66 been energized.

Figure 30 illustrates the condition which exists when the solenoid 62 has been energized. This solenoid is positioned nearest to the shaft 150 about which the lever member 149 pivots and it will be apparent that the type font 101 has been moved the extreme distance to the left. Energization of either solenoid 63 or 64 would have caused a lesser leftward movement of the type font.

It is not contemplated that more than one of the solenoids 60 to 66 will be energized at one time. Fiber stops 161 and 162 serve to limit the extent of rightward and leftward movement of the type font by engaging the upper end of the bell crank 144.

While not more than one of solenoids 60 to 66 is energized at one time and not more than one of the solenoids 67, 68, and 69 is energized at one time, it is contemplated that one of the solenoids 60 to 66 may be energized simultaneously with energization of one of the solenoids 67, 68, and 69. The type font may thus partake of simultaneous longitudinal and angular movement, thereby reducing to a minimum the time required to move the type font to a selected position. The fact that the lever members 110 and 113 are spring biased to the position shown in Figure 20 causes the type font 101 to return to the neutral angular position shown in Figure 20 when all of the solenoids 67, 68 and 69 are de-energized. The spring members 155 and 159 cause the lever members 149 and 157 to return to their respective positions shown in Figure 28 when all of the solenoids 60 to 66 are de-energized. Figure 28 illustrates the type font in its neutral longitudinal position.

The linkages for controlling the movements of the type font are being particularly claimed in my copending application, Serial No. 301,402, filed July 28, 1952, entitled "Mechanical Movement," now U. S. Patent No. 2,680,970 dated June 15, 1954.

*Paper tape supply*

Referring now to Figures 1 and 19, the printing is done on a paper tape 201 from a roll supply 202 supported on a spool 203 mounted on the back wall of a housing 204. The rearward plate 205 of the spool 203 is removable for the purpose of replenishing the tape supply by removing knurled nuts 206 and 207 from threaded lug bolts 208 and 209. The central lug bolt 28 is provided with a freely rotatable sleeve 210 which extends through the open center of the roll supply 202. The lug bolt 209 is provided with a freely rotatable sleeve 211 under which the tape 201 passes from the roll supply 202 to a tension roller 212 mounted on a bracket 213 having a slot 214 therein to permit vertical movement of the shaft of the roller 212. A clip spring member 215 urges the roller 212 downwardly. From the roller 212, the tape 201 passes upwardly to a roller 216 mounted on a bracket 217 secured to one end wall of the housing 204. The tape 201 then proceeds to a vertically disposed roller 218 carried by a bracket 219 secured to the end wall of the housing. The tape 201 then passes through a slot 220 in the housing, through an opening 221 in the end wall 103 and to a flat tape guide housing 222 which extends across the character bearing surface 106 of the type font 101. The flat tape guide housing 222 is vertically adjustable for the purpose and in the manner hereinafter described. Upon leaving the tape guide housing 222 the tape 201, which has now been printed, passes through tape feed mechanism hereinafter described, which functions to advance the tape step by step.

*Shifting of printing zone to print letters or figures*

It has been pointed out above that the type font may be moved to any one of eight positions of longitudinal adjustment and to any one of four positions of angular adjustment. The type font thus can assume any one of 32 positions. By the arrangement about to be described, it is possible to print either of two characters when the type font is in a selected position. This is accomplished by providing two characters on the type font corresponding to the selected positions and shifting the tape so that it overlies the desired either one of the two characters during the printing operation. This arrangement would permit the printing of 64 different characters, although as a practical matter that number of characters are not necessary and I have illustrated only 52 characters on the character bearing surface 106 of the type font.

The paper guide housing 222 is secured to an angular bracket member 231 by means of rivets 232. The leg 233 of the angular bracket 231 has a large opening therein into which is fitted an annular bearing member 234 which is concentric with the hub portion 108 of the type font 101. The annular bearing member 234 is pivotally supported by means of a tubular shaft 235 which is secured in an opening in a fixed partition 236 by means of screws 237.

The angular bracket 231 also has fixed thereto one end of a leaf spring 238 and fixed to the free end of the spring is a printing block 239 which may be of rubber or other durable resilient material. The printing block 239 lies adjacent a window 240 which extends through the angular bracket 231 and through the rear wall of the paper housing 222. The inked ribbon 241 passes through a guide member 242 secured to the angular bracket 231 and lies between the tape exposed within the housing 222 and the character bearing surface 106 of the type font 101.

It will be apparent that when the printing block 239 strikes the paper tape 201 through the window 240, the paper tape and the inked ribbon 241 will be forced against the character on the type font which is aligned with the printing block 239. That character will thus be printed on the paper tape 201. To serve this purpose there is provided a printing striker arm 77 which is pivotally mounted by means of a pivot pin 251 on a bracket 252 above the plunger 253 of the printing solenoid 75. The printing striker arm 77 is biased toward its position shown in Figure 22 by means of a tension spring member 254. A resilient bumper 255 is secured to the bracket 252 by any suitable means such as a screw 256, the bumper 255 serving to cushion the shock and to reduce the noise of operation of the printing striker arm 77.

The printing striker arm 77 is provided with two heads for selectively striking the printing block 239. The lower head 261 will strike the printing block 239 when the elements are in the relative positions shown in Figure 22. The upper head 262 will strike the printing block 239 when the printing block and its associated elements are shifted to the positions shown in Figure 23. This shifting of the printing block 239 and its associated elements is accomplished by energization of the solenoid 73, which is attached by means of a link 263 to the free end of the leg 233 of the angular bracket 231. The assembly is biased toward the position illustrated in Figure 22 by means of a tension spring member 264. In this position the printing block 239 will, in any position of the type font, overlie a character in one of the rows 265, 266, 267 or 268 on the character bearing surface 106 of the type font. The characters in these rows are predominantly letters, as will be seen from reference to Figure 25. When the solenoid 73 is energized, the angular bracket 231 and the elements carried thereby, including the printing block 239, will swing to the positions shown in Figure 23. The printing block 239 will then, in any position of the type font, overlie a character in one of rows 269, 270, 271 or 272 on the type font, which characters are predominantly numerals or other miscellaneous characters. It will thus be seen that a character in one of the rows 265, 266, 267 or 268 will be printed when the solenoid 73 is not energized and that one of the characters in the rows 269, 270, 271 or 272 will be printed when the solenoid 73 is energized.

The angular bracket 231 is also provided with an upwardly extending arm 280 having a laterally extending portion 281 which, upon energization of the solenoid 73, is arranged to be engaged by the hooked end 282 of a spring latch 283. The latch 283 is shown in engaged condition in Figure 23 and the assembly of elements will remain in this position until the solenoid 72 is energized. The pivoted armature 284 will then engage a post 285 on the latch 283 to disengage the latch. The tension spring member 264 will then return the elements to the positions shown in Figure 22.

The contacts 92 (Figures 22 and 38) are opened upon energization of the solenoid 73 by an extension 286 of the armature thereof. The contacts 90 are similarly opened upon energization of the solenoid 72 by a leg 287 on the pivoted armature 284.

The space relay 74 of Figure 38 is designated by the same reference numeral in Figures 19 and 31. The rectifiers 70 and 71 of Figure 38 are designated by corresponding reference numerals in Figures 18, 19, 20, 22 and 31.

*Paper tape and inked ribbon feed mechanisms*

The tape feed solenoid 76 of Figure 38 constitutes the power source for the feeding of the paper tape and the inked ribbon. This solenoid is best shown in Figure 36 and it is provided with a reciprocating armature 301. The solenoid is fixed to the rear plate 302 by means of screws 303. The reciprocating armature 301 is connected by means of a link 304 to a lever 305 which is fixedly secured to a horizontal shaft 306. The shaft 306 is rotatably mounted in the rear wall 302 and in a partition 307. The lever arm 305 is biased against an adjustable stop member 308 by means of a tension spring member 88, which is also shown in Figure 38. Also fixedly secured to the horizontal shaft 306 is a miter gear 309 which meshes with a miter gear 310 fixedly secured to a vertical shaft 311. The vertical shaft 311 is rotatably mounted in a bearing block 312, which is best shown in Figure 32, and which is fixed between the rear wall 302 and the partition 307. Fixed to the vertical shaft 311 is a lever arm 313. The free end of the lever arm 313 is pivotally connected to a pawl 87 by means of a pin 315. A clip spring member 316 urges the pawl 87 into engagement with the ratchet wheel 89. The pawl 87 and the ratchet wheel 89 are also diagrammatically illustrated in Figure 38.

The ratchet 89 is fixed to a shaft 317 which is rotatably mounted in a U-shaped bracket 318 secured to the rear wall 302 by means of screws 319. Also fixed to the shaft 317 is a tape feed wheel 320 having thereon a covering 321 of rubber or other material for effectively engaging the paper tape 201. The printed tape passes to the rear of a vertical pin 322 and around a portion of the rubber covered tape feed wheel 320. A lever 325 is pivotally connected to the U-shaped bracket 318 by means of a pin 326. A knurled roller 327 is rotatably mounted on a shaft 328 carried by the lever 325. A clip spring member 329 serves to urge the knurled roller 327 toward the surface of the tape feed wheel 320. The lever 325 also carries a vertically extending pin 330 which serves to guide the tape to an exit opening 331 in the left end wall of the housing 204. The paper tape 201 can be threaded in the manner best illustrated in Figure 19 by swinging the lever 325 to the left, as seen in that figure, to enable the tape to be inserted between the knurled roller 327 and the surface 321 of the tape feed wheel 320. It will be apparent that each time the solenoid 76 is energized, energy will be stored in the tension spring member 88. Upon de-energization of the solenoid 76, the stored energy in the spring 88 will cause the pawl 87 to impart slight rotation to the ratchet wheel 89 and the tape feed wheel 320. A spring detent 332 (see Figure 19) prevents reverse movement of the ratchet wheel 89 and of the tape feed wheel 320.

The inked ribbon is provided with an upper ribbon spool 401 and a lower ribbon spool 402. The upper ribbon spool 401 is held in position on a stub shaft 403 by means of a retaining member 404. The spool 401 has projections thereon which are designated by the reference numeral 405 and which engage apertures 406 in a spool drive plate 407. The spool drive plate 407 is fixedly secured to a ratchet wheel 408. The assembly of the spool 401, the drive plate 407 and the ratchet wheel 408 are rotatable as a unit on the stub shaft 403. The stub shaft 403 is rigidly fixed to the rear plate 302 by means of a threaded end and a nut 409. The lower ribbon spool 402 is provided with a similar stub shaft 410, a retaining member 411, a drive plate 412, and a ratchet wheel 413, these elements being rotatable as a unit on the stub shaft 410.

The ribbon 241 from the upper ribbon spool 401 passes through an upper eyelet in a bracket 415 secured to the rear plate 302. The ribbon 241 then passes over an upper guide pin 416, downwardly through the ribbon guide 242, around a lower guide pin 417, through the lower eyelet of the bracket 415, and back to the lower ribbon spool 402.

The ribbon feed mechanism is also driven by energy stored in the tension spring 88 by the solenoid 76. The shaft 306 extends through the rear wall 302 and fixed to the rearward end of the shaft is a lever 420 which extends generally horizontally in parallel relationship to the rear wall 302. A pawl 421 is pivotally connected to one end of the lever 420 by means of a pivot pin 422. A clip spring 423 tends to urge the upper end of the pawl 421 into engagement with the ratchet wheel 408. A similar pawl 424 is pivotally connected to the opposite end of the lever 420 by means of a pivot pin 425. A clip spring 426 tends to urge the lower end of the pawl 424 into engagement with the lower ratchet wheel 413. The pawl 421 may be forced out of engagement with the ratchet wheel 408 by means of a cam lever 431. A stop member 432 limits the extent of movement of the pawl 421 away from the ratchet wheel 408. The cam lever 431 is pivoted to the rear plate 302 by means of a pivot pin 433. A similar cam lever 434 is pivotally connected to the rear plate 302 by means of a pivot pin 435 and this cam lever may be used to force the pawl 424 out of engagement with the ratchet wheel 413 and into engagement with a stop member 436.

The lower end of the cam lever 431 is pivotally connected to a diagonal link 437 by means of a pivot pin 438. The upper end of the diagonal link 437 is pivotally connected by means of a pivot pin 439 to the upper end of the cam lever 434. The lower end of the diagonal link 437 is also connected to one end of the horizontal link 440 by means of the pivot pin 438. The opposite end of the horizontal link 440 is pivotally connected by means of a pivot pin 441 to the lower end of the element which is designated generally by the reference numeral 442 and which forms a portion of an over-center mechanism. A stub shaft 443 extends rearwardly from the rear plate 302 and forms a pivotal axis about which the member 442 can pivot from the position shown in Figure 31 in which it is in engagement with a stop member 444, to a second position in which it is in engagement with a stop member 445, both stop members being fixed to the rear plate 302. When the member 442 is in engagement with the stop member 444, as indicated in Figure 31 of the drawings, the horizontal link 440 and the diagonal link 437 cooperate to cause the cam lever 431 to force the pawl 421 out of engagement with the ratchet wheel 408. At the same time the cam lever 434 is retracted from engagement with the pawl 424 and this pawl is urged into engagement with the ratchet wheel 413 by means of the clip spring 426. Under these circumstances, the lower ribbon spool 402 will be driven step by step by the spring member 88 after successive energizations of the solenoid 76.

When, however, the member 442 of the over-center mechanism is moved so that it engages the stop member 445, the mechanism, including the horizontal link 440 and the diagonal link 437, cooperates to force the pawl 424 out of engagement with the ratchet wheel 413 and to retract the cam lever 431 so that the pawl 421 is urged into engagement with the ratchet wheel 408. Under these circumstances, the upper ribbon spool 401 will be driven through the medium of the tension spring member 88.

The upper end of the diagonal link 437 has secured thereto a cantilever leaf spring 447, the free end of which engages a detent member 448 which is pivotally mounted to the rear plate 302 by means of a pivot pin 449. When the pawl 421 is arranged to operably engage the ratchet wheel 408, the detent member 448 will be resiliently urged into engagement with the ratchet wheel 408 to prevent retrograde movement of the upper ribbon spool 401. The lower end of the diagonal link 437 is provided with a comparable cantilever leaf spring 450 which engages the detent member 451, pivotally mounted to the rear plate 302 by means of a pivot pin 452. Detent member 451 functions to prevent retrograde movement of the lower ribbon spool 402 when that spool is driven by means of the pawl 424.

The over-center mechanism also includes a member 461 which is pivotally mounted on the stub shaft 443. A tension spring member 462 has its upper end connected to the upper end of the member 461 while its lower end is connected to a ring-like member 463 which loosely surrounds the stub shaft 443. A tension spring member 464 is also connected to the ring-like member 463 at its upper end, its lower end being connected to an extension 465 on the member 442. When the member 461 occupies the position shown in Figure 31, the tension spring members 462 and 464 urge the member 442 to the position shown in that figure and under such circumstances the pawls 421 and 424 will be in the positions shown. The position of the member 461 which is illustrated in Figure 31 is determined by a stop member 466 which is secured to the rear plate 302. If, however, the member 461 is moved so that its upper end engages a stop member 467 carried by the rear plate 302, the tension spring members 462 and 464 will cause the member 442 to draw the horizontal link 440 to the left, as seen in Figure 31, and the pawl 424 will be permitted to engage the ratchet wheel 413 while the pawl 421 is forced out of engagement with the ratchet wheel in the manner described above.

The ribbon 241 has secured thereto a metal tab 475 adjacent the end of the ribbon which is secured to the upper ribbon spool 401. The ribbon passes through a slot 476 in the upper end of the member 461. When the supply of ribbon from the ribbon spool 401 is about to become exhausted, the metal tab 475 comes into engagement with the upper end of the member 461 and causes that member to be shifted to reverse the direction of ribbon feed. A slot 477 is provided in the lower end of the member 461. The lower end of this member 461 will be engaged by another metal tab carried on the opposite end of the ribbon 241 just prior to exhaustion of the supply of ribbon from the lower ribbon spool 402. The direction of ribbon feed will then again be reversed.

Figure 3:
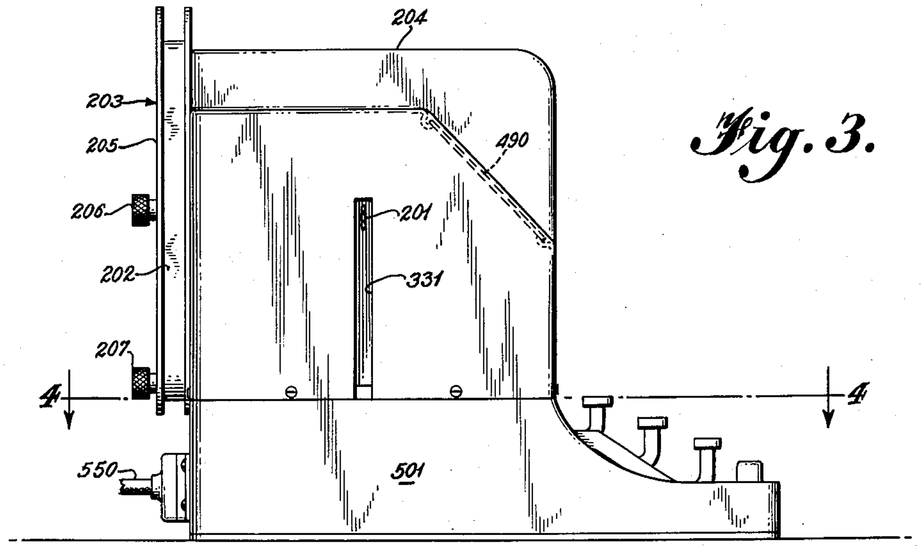
Figure 3 is an end elevational view showing the end of the apparatus opposite to that seen in Figure 1.

The housing 204 is preferably sloped as indicated in Figures 3 and 18 and a transparent window 490 is positioned therein to permit the tape to be observed after printing and prior to exit through the tape exit opening 331. A multiple contact socket 492 is recessed in the rear wall of the housing 204 and provides the appropriate electrical connections to the mechanical features of the apparatus described above.

*The keyboard and the switching mechanism for electrically connecting the oscillators to the transmitter*

The mechanical elements and features which have been thus far described pertain to apparatus for printing on a tape a message which is received by the receiver 13 of Figure 38. This apparatus would be sufficient in those instances in which reception of messages is all that is required. However, it is desirable in most instances that the apparatus be capable of transmitting as well as receiving messages. It has been pointed out that the switches 1 to 6 of Figure 37 control the connection of the oscillators 7 to 11 to the transmitter 12. My invention includes a keyboard mechanism for automatically closing the appropriate combination of the switches 1 to 6 so that an appropriate signal, corresponding to a key which has been depressed, is transmitted by the transmitter 12.

The keyboard and its associated mechanism is preferably enclosed in a housing 501 which is preferably of a size and configuration to form a base for the housing 204.

Figure 4:
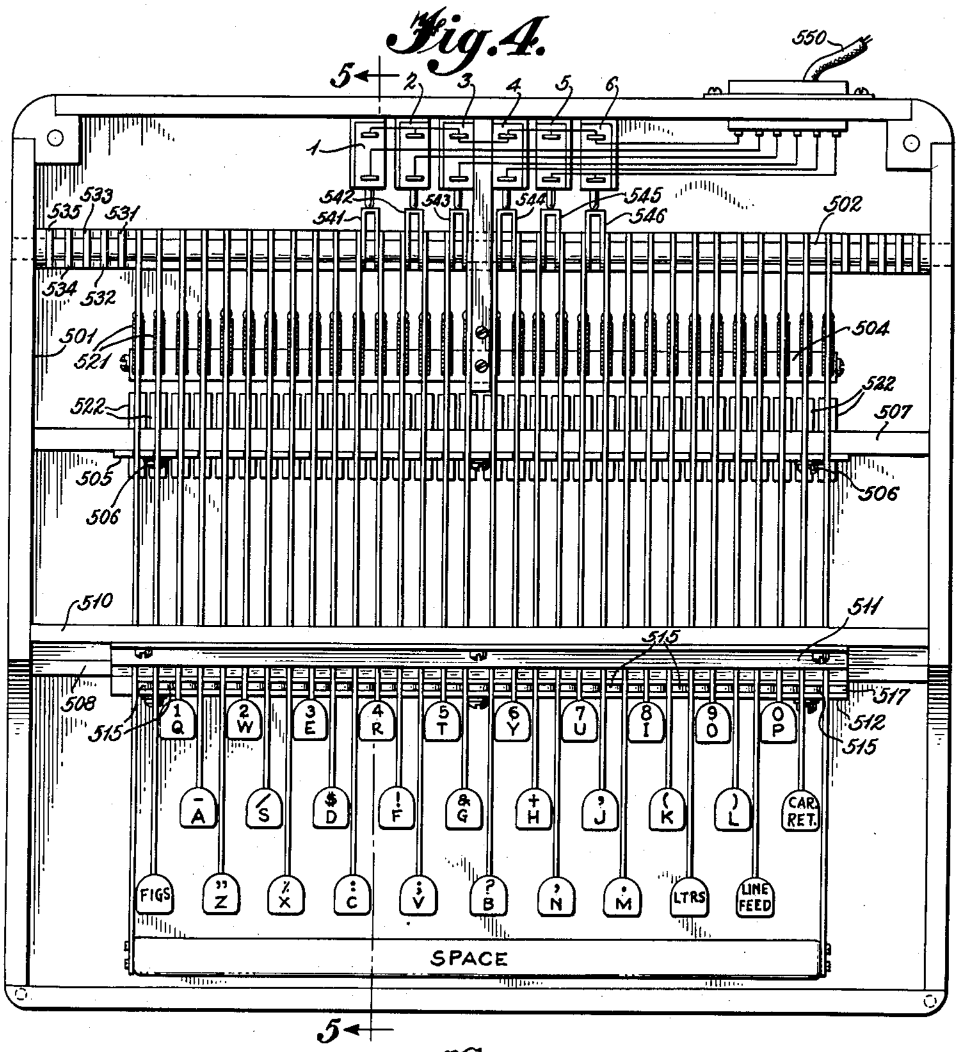
Figure 4 is a horizontal sectional view taken in the direction of the arrows along the line 4—4 of Figure 3.
Figure 8:
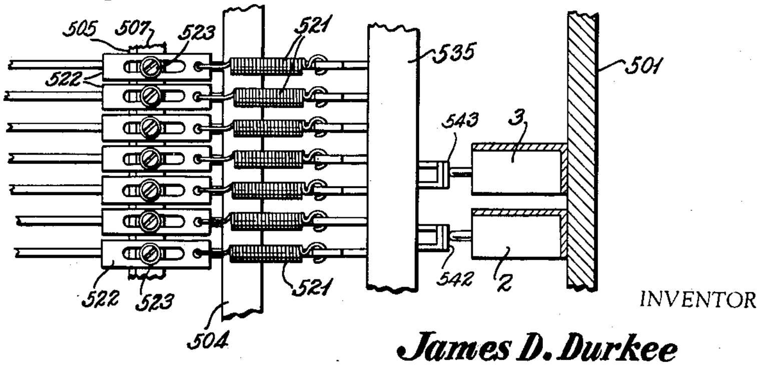
Figure 8 is a fragmentary bottom plan view partly in section and taken in the direction of the arrows along the line 8—8 of Figure 5.

A plurality of keys is provided, as best shown in Figure 4. I provide one key for each letter of the alphabet, these keys also being used to initiate the printing of numbers and other miscellaneous characters. I also provide a key marked "Figs" which can be used to initiate energization of the solenoid 73 which shifts the printing block 239 and its associated elements to the position shown in Figure 23 to cause printing of numbers or other miscellaneous characters. After depression of the "Figs" key, the latch member 281 will become engaged to retain the printing assembly in position to print numbers or other miscellaneous characters. When it is desired to resume the printing of letters, a key marked "Ltrs" is depressed which initiates energization of solenoid 72 to release the latch 283, whereupon the printing mechanism returns to the condition illustrated in Figure 22 for the purpose of printing letters. The printing of letters will then continue until the "Figs" key is again depressed.

I also provide a space bar marked "Space" which can be depressed to initiate energization of the solenoid 76 to permit the tension spring member 88 to advance the paper tape and, incidentally, to advance the inked ribbon. I also provide a "Line feed" key and a carriage return key marked "Car. Ret." These keys are unnecessary and are not used when the message being transmitted is to be received by another tape printer. However, the transmitted message may be received by a page printer in which case it is necessary to provide means for returning the carriage of the page printer and providing for line feed.

The letters on the keys are arranged in the manner of standard keyboards. This facilitates operation by any person familiar with a standard typewriter.

Each of the keys is mounted on a key bar which will hereinafter be referred to by the letter or other indicia appearing on its associated key. The key bars are all pivotally mounted on a horizontal shaft 502 which is suitably journaled at its ends in the housing 501. The "Space" bar has two key bars and these key bars are joined by a reinforcing and stiffening member 504. A comb-like member 505, having a plurality of vertically extending slots therein, is secured by means of screws 506 to a horizontal reinforcing bar 507 which extends from one side to the other of the housing 501. The comb-like member 505 and the slots therein provide guides for the key bars.

The lower partition 508 is provided in the housing 501 and this lower partition supports a stop member 509 of resilient material which serves to limit the downward movement of the key bars and acts as a cushion for the key bars. An upper partition 510 is also provided and this partition supports an upper cushion 511 which limits the upward movement of the key bars.

The lower partition 508 also supports a bar 512 having a longitudinally extending slot 513 therein. The bar 512 also has a plurality of vertically extending slots 514, there being one slot 514 for each of the key bars. A plurality of ring-like members 515 are positioned in the longitudinally extending slot 513 between the closed end 516 thereof and a plug 517 adjacent the opposite end thereof. The ring-like members 515 provide barely sufficient clearance to permit one only of the key bars to be depressed into its associated vertical slot 514. In other words, when one key bar is depressed into its vertical slot 514, the ring-like members 515 on either side of the depressed key bar will be forced so closely together that no other key bar may be depressed until the initially depressed key bar has been permitted to rise. This arrangement reduces the probability of errors by preventing the depressing of more than one key at a time.

Each of the key bars is provided with a depending leg adjacent the horizontal shaft 502. A tension spring member 521 is provided for each of the key bars to assure that the keys will rise after having been depressed. Each tension spring member 521 has one end secured to the depending leg of its associated key bar while its opposite end is secured to a slotted attachment member 522 which is adjustably secured to the lower surface of the transverse reinforcing bar 507 by means of a screw 523. The tension in the spring members 521 can be adjusted by moving the attachment members 522 relative to the transverse bar 507. In this manner the pressure required to depress the keys is adjustable.

Figures 5, 6:
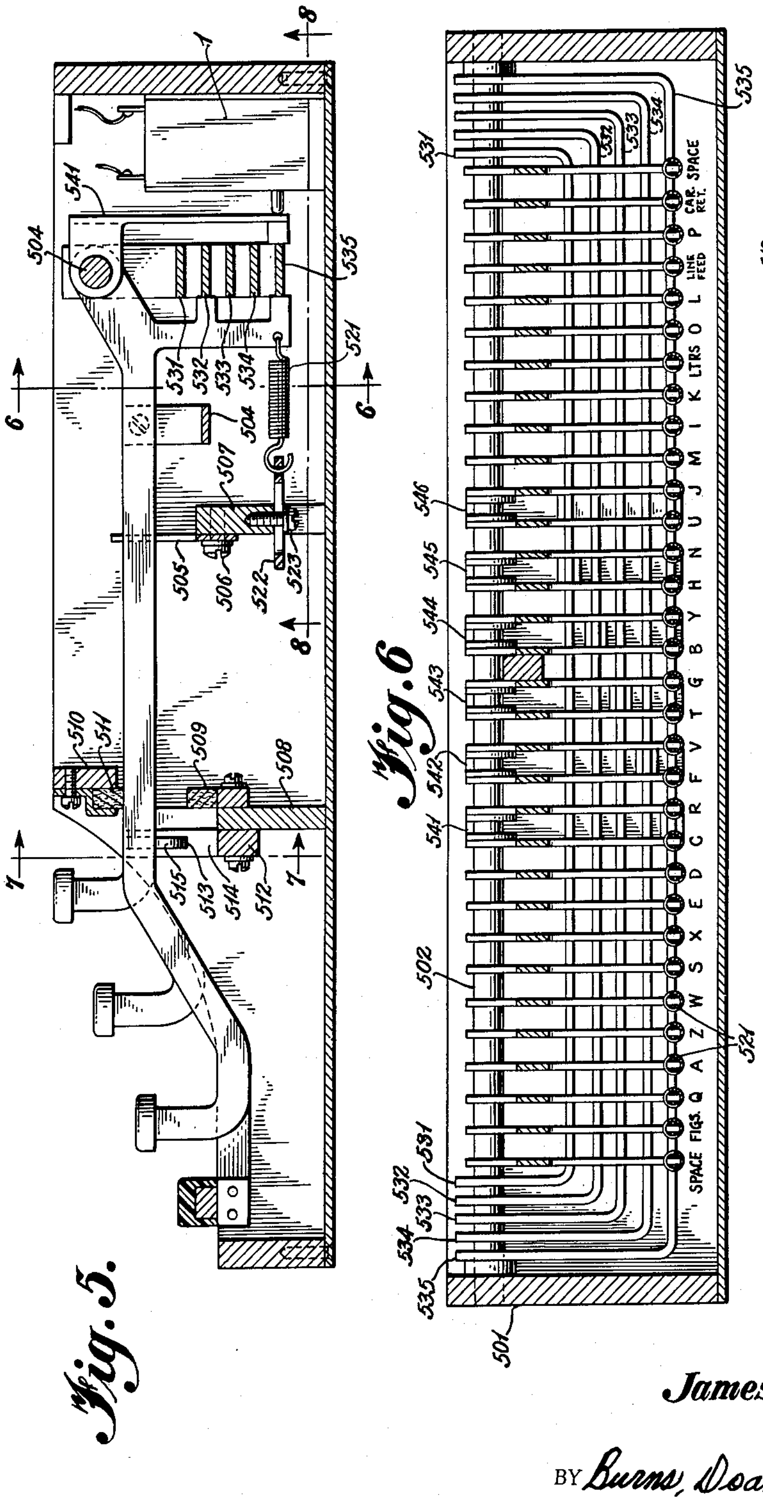
Figure 5 is a vertical sectional view taken in the direction of the arrows along the line 5—5 of Figure 4.
Figure 6 is a vertical sectional view taken in the direction of the arrows along the line 6—6 of Figure 5.
Figure 7:
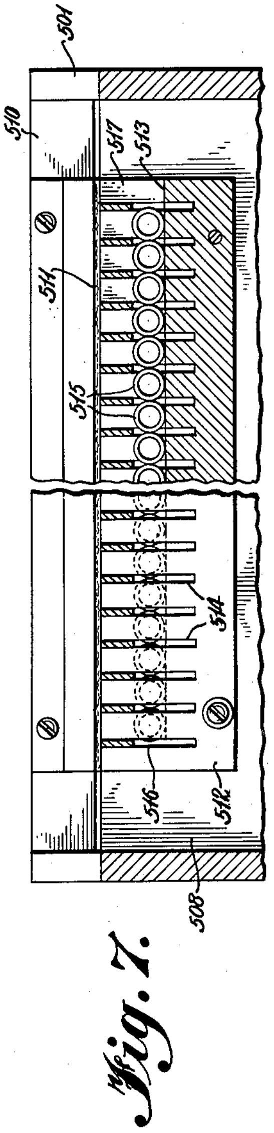
Figure 7 is a vertical sectional view taken in the direction of the arrows along the line 7—7 of Figure 5.
Figures 14, 15, 16, 17:
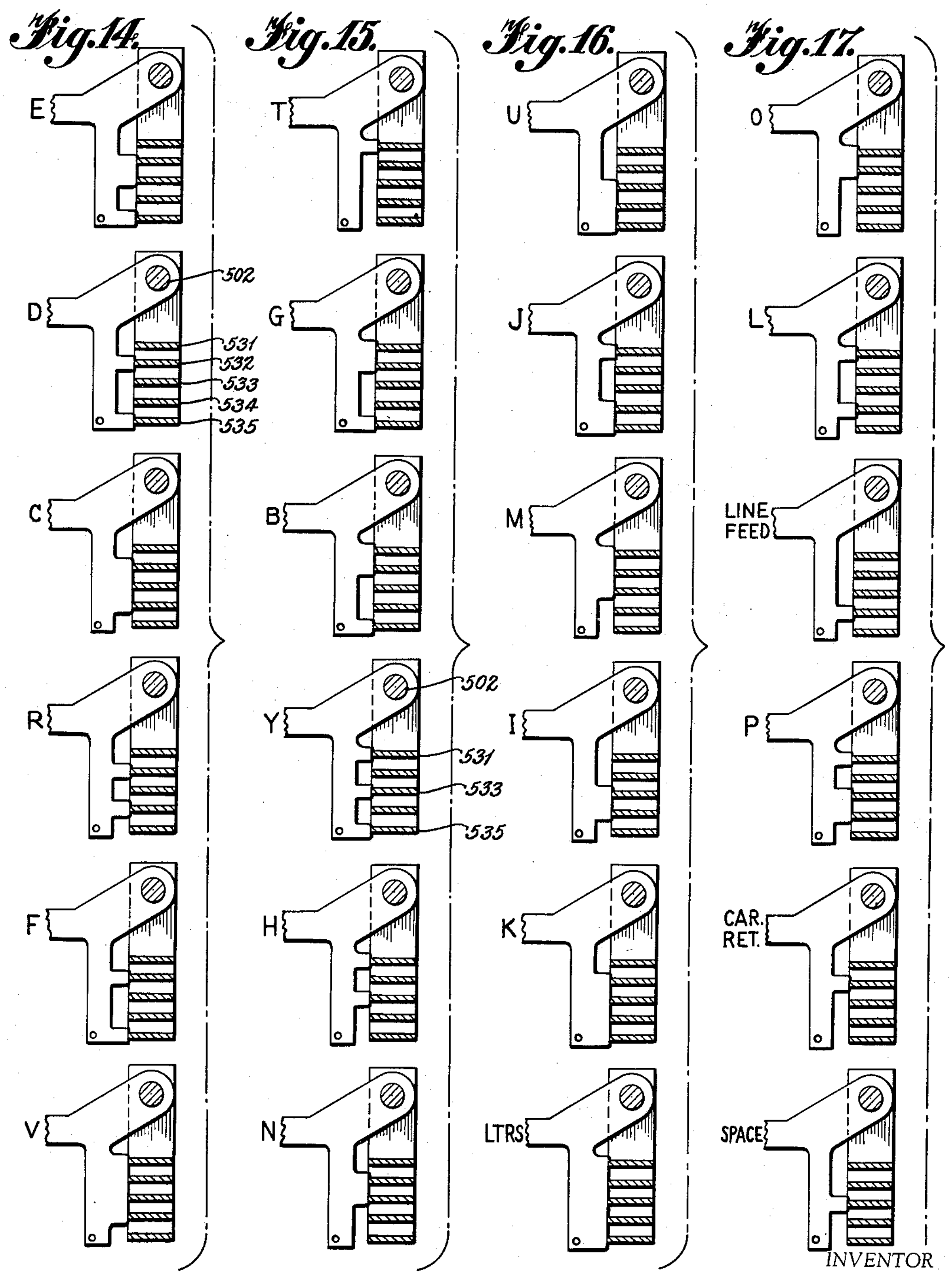

Five intermediate U-shaped bars 531, 532, 533, 534 and 535 are pivotally mounted on the horizontal shaft 502, as most clearly shown in Figures 5 and 6. The depending legs on the key bars are each individually designed so that depression of each key will cause pivotal movement of a different one or a different combination of two or more of the intermediate U-shaped bars 531 to 535. The design of all of the depending legs of the key bars and of their relationship to the U-shaped bars 531 to 535 is shown in Figures 10 to 17, inclusive, of the drawings. By reference to Figure 10, for example, it will be seen that when the "Space" bar is depressed the U-shaped bar 533 will be caused to move pivotally about the horizontal shaft 502. It will also be seen fom Figure 10 that when the "Figs" key is depressed, the U-shaped bars 531, 532, 534 and 535 will be pivotally moved about the horizontal shaft 502, but that the U-shaped bar 533 will remain stationary. By reference to Figure 15 it will be seen that when the "Y" key is depressed, the U-shaped bars 531, 533 and 535 will be caused to partake of pivotal movement about the horizontal shaft 502. It is believed that a study of Figures 10 to 17 in the light of these examples will provide a clear explanation of the manner in which the different U-shaped bars or different combinations of the U-shaped bars are pivotally moved on the depression of the different keys.

Figure 9:
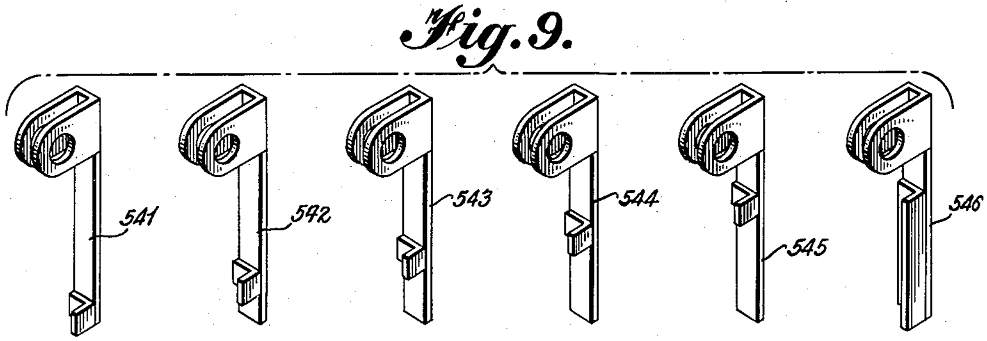
Figure 9 is a perspective view of the six switch-actuating arms which are controlled by the keyboard.
Figures 10, 11, 12, 13:
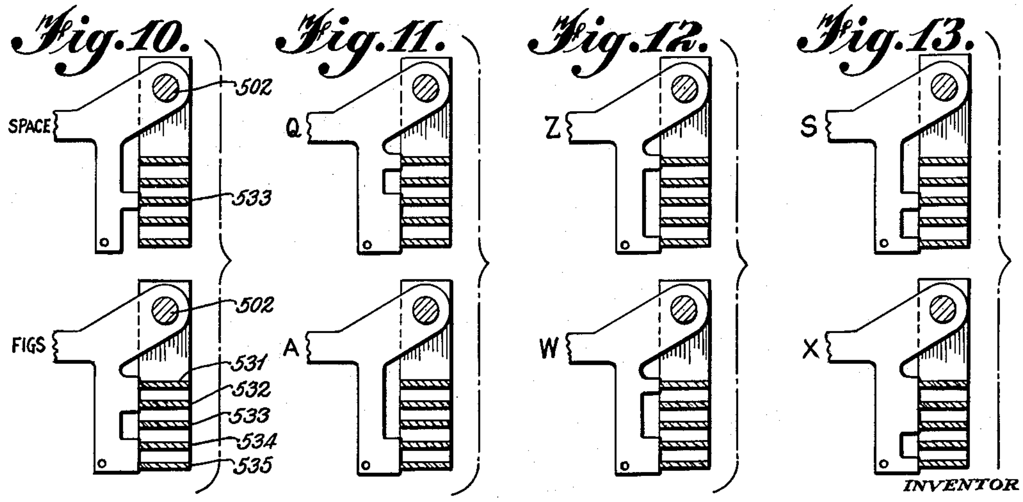

Pivotal movement of the U-shaped bars 531 to 535 control the pivotal movement of switch bars of 541, 542, 543, 544, 545 and 546. These switch bars are illustrated in perspective in Figure 9. The switch bars are pivotally mounted on the horizontal shaft 502 in the positions shown in Figure 4, and are arranged, upon actuation, to depress the plungers of the switches 1 to 6, inclusive, which are preferably of the snap-action type.

The switch bar 541 associated with the switch 1 will be caused to move to close the switch 1 only when the U-shaped bar 535 is moved pivotally about the horizontal shaft 502. The switch bar 542 will be caused to close its associated switch 2 only when the U-shaped bar 534 is moved about the horizontal shaft 502. The switch bar 543 will close its associated switch 3 only when the U-shaped bar 533 is pivotally moved on the shaft 502. The switch bar 544 will close its associated switch 4 when the U-shaped bar 532 is pivotally moved. The switch bar 545 will close its associated switch 5 upon pivotal movement of the U-shaped bar 531. The switch bar 546 will close its associated switch 6 when any one or any combination of the U-shaped bars 531 to 535 is caused to move pivotally about the horizontal shaft 502.

Let it be assumed, for example, that the "Y" key is depressed. By reference again to Figure 15, it will be seen that the depression of the "Y" key will cause the U-shaped bars 531, 533 and 535 to partake of pivotal movement about the horizontal shaft 502. The U-shaped bar 535 will engage the switch bar 541 and will cause the switch 1 to be closed. The U-shaped bar 533 will engage the switch bar 543 to close the switch 3. The U-shaped bar 531 will engage the switch bar 545 to close the switch 5. The switch bar 546 will, of course, also have been engaged, and will close the switch 6. The closing of the switches 1, 3, 5 and 6 will cause the appropriate signal to be transmitted by the transmitter 12, and will cause the letter "Y" to be printed at the receiver in the manner described above. If the "Figs" key had been depressed prior to depressing the "Y" key, the number "6" would have been printed.

A cable 550 may be provided for connecting the switches 1 to 6, inclusive, to the oscillators 7 to 11 in the manner indicated in Figure 37.

I have illustrated and described a specific embodiment of my invention which I now consider to be the preferred form thereof. However, it will be apparent that various modifications and alterations may be made without departing from the broader scope of the invention which is defined by the following claims.

Having thus described my invention, I claim:

1. Printing mechanism comprising a movable type font on the surface thereof a plurality of horizontally and vertically spaced pairs of individual printing characters, a printing block, means for supporting paper between said surface of said type font and said block, means for moving said block to force the paper toward said type font, means for selectively moving said type font to bring a desired pair of printing characters adjacent said block, and means for shifting said block and paper in a direction generally parallel to the surface of said type font to cause one only of the printing characters of said desired pair to be reproduced on the paper upon forcing of the paper toward the type font.

2. Printing mechanism comprising an angularly and longitudinally movable type font having on the surface thereof a plurality of angularly and longitudinally spaced pairs of individual printing characters, a printing block, means for supporting paper between said surface of said type font and said block, means for moving said block to force the paper toward said type font, means for selectively moving said type font angularly and longitudinally to bring a desired pair of printing characters adjacent said block, and means for shifting said block and said paper angularly across the surface of said type font to cause one only of the printing characters of said desired pair to be reproduced on the paper upon forcing of the paper toward the type font.

3. Printing mechanism comprising a movable type font having a surface thereon bearing a plurality of horizontally and vertically spaced pairs of individual printing characters, a printing block, means for supporting paper and a ribbon between said surface of said type font and said block, means for moving said block to force the paper and ribbon against said type font, means for selectively moving said type font to bring a desired pair of printing characters adjacent said block, and means for shifting said block and paper over the surface of said type font to cause the paper and ribbon to engage one only of the printing characters of said desired pair.

4. Printing mechanism comprising a longitudinally and angularly movable type font having an arcuate surface thereon bearing a plurality of horizontally and vertically spaced pairs of individual printing characters, a printing block, means for supporting paper between said surface of said type font and said block, means for moving said block to force the paper toward said type font, means for simultaneously moving said type font both angularly and longitudinally to bring a desired pair of printing characters adjacent said block, and means for shifting said block and paper across the surface of said type font to cause one only of the printing characters of said desired pair to be reproduced on the paper.

5. Printing mechanism comprising a stationary shaft, a type font slidable longitudinally of said shaft and angularly movable thereon, said type font having an arcuate surface thereon which is concentric with said shaft, a plurality of longitudinally and angularly spaced pairs of printing characters on said arcuate surface, a paper tape support mounted for pivotal movement about an axis coincident with the axis of said shaft and arranged to support a paper tape in a printing zone adjacent said arcuate surface, means for moving said type font longitudinally and angularly on said shaft to position a desired pair of printing characters in said printing zone, means for pivoting said paper tape support to position said tape to predominately overlie one of the printing characters of said desired pair, and means for pressing the portion of said paper tape overlying said one character toward said arcuate surface to print the desired character on the tape.

6. Printing mechanism comprising a longitudinally and angularly movable type font having an arcuate surface thereon, a plurality of printing characters longitudinally and angularly spaced on said arcuate surface, a bracket positioned adjacent said arcuate surface of said type font, a printing block resiliently supported by said bracket, a paper support carried by said bracket and arranged to support a paper between said arcuate surface and said printing block, means for moving said type font longitudinally and angularly to position a desired printing character adjacent said printing block, and a printing striker arm for striking said printing block to force said paper toward said arcuate surface to print said desired character on the paper.

7. Printing mechanism comprising a shaft, a type font movable longitudinally and angularly on said shaft, said type font having an arcuate surface which is concentric with said shaft, a plurality of printing characters longitudinally and angularly spaced on said arcuate surface, a bracket positioned adjacent said arcuate surface, a printing block resiliently supported by said bracket, a paper tape support carried by said bracket and arranged to support a paper tape between said arcuate surface and said printing block, means for moving said type font longitudinally and angularly to position a desired printing character adjacent said printing block, and a printing striker arm for striking said printing block to force said paper tape toward said arcuate surface to print said desired character on the tape.

8. Printing mechanism comprising a stationary shaft, a type font movable longitudinally and angularly on said shaft, said type font having an arcuate surface which is concentric with said shaft, a plurality of printing characters longitudinally and angularly spaced on said arcuate surface, an angular bracket having a portion which extends across said arcuate surface, a printing block resiliently suported by said portion of said bracket, a paper tape support carried by said portion of said bracket and arranged to support a paper tape in generally parallel relationship to said shaft between said arcuate surface and said printing block, means supporting an inked ribbon between said paper tape and said arcuate surface, said ribbon extending at substantially right angles to said paper tape, means for moving said type font longitudinally and angularly to position a desired printing character adjacent said printing block, a printing striker arm for striking said printing block to force said paper tape and said ribbon toward said arcuate surface to print said desired character on the tape, and means for advancing said paper tape and said ribbon after each actuation of said printing striker arm.

9. In a telegraph printer, an angularly and rectilinearly movable type font having a neutral position, a first mechanism for imparting angular movement to said type font, a second mechanism for imparting rectilinear movement to said type font, each of said mechanisms comprising a pair of lever arms which are independently oscillatable about fixed axes, means for biasing said lever arms toward definite normal positions, thereof, a pair of links pivotally connected to said lever arms at points spaced from the fixed axes thereof, said links being pivotally connected together by a pivot pin which occupies a definite neutral position when both said lever arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned adjacent the lever arms of said first mechanism at different distances from the axes thereof, means for selectively energizing one only of said first group of solenoids to move said type font angularly in one direction or the other from its neutral position by an amount dependent on the one of said solenoids of said first group which is energized, a second group of solenoids positioned adjacent the lever arms of said second mechanism at different distances from the axes thereof, means for selectively energizing one only of the solenoids of said second group to move said type font rectilinearly in one direction or the other from its neutral position by an amount dependent on the one of said solenoids of said second group which is energized, and means for printing an alphabetical character corresponding to the angular and rectilinear orientation of said type font.

10. In a telegraph printer, a rectilinearly movable type font having a neutral position, mechanism for imparting rectilinear movement to said type font comprising a pair of lever arms which are independently oscillatable about fixed axes, means for biasing said lever arms toward definite normal positions thereof, a pair of links pivotally connected to said lever arms at points spaced from the fixed axes thereof, said links being pivotally connected together by a pivot pin which occupies a definite neutral position when both said lever arms are in their normal positions, means connecting said pivot pin to said type font to impart rectilinear movement to the type font from its neutral position upon movement of the said pivot pin from its neutral position, a group of solenoids positioned adjacent the lever arms of said mechanism at different distances from the axes thereof, means for selectively energizing one only of said solenoids to move said type font rectilinearly in one direction or the other from its neutral position by an amount dependent on the one of said solenoids which is energized, and means for printing an alphabetical character corresponding to the orientation of said type font.

11. In a telegraph printer, an angularly movable type font having a neutral position, mechanism for imparting angular movement to said type font comprising a pair of lever arms which are independently oscillatable about fixed axes, means for biasing said lever arms toward definite normal positions thereof, a pair of links pivotally connected to said lever arms at points spaced from the fixed axes thereof, said links being pivotally connected together by a pivot pin which occupies a definite neutral position when both said lever arms are in their normal positions, means connecting said pivot pin to said type font to impart angular movement to said type font from its neutral position upon movement of such pivot pin from its neutral position, a group of solenoids positioned adjacent said lever arms at different distances from the axes thereof, means for selectively energizing one only of said solenoids to move said type font angularly in one direction or the other from its neutral position by an amount dependent on the one of said solenoids of said first group which is energized, and means for printing an alphabetical character corresponding to the orientation of said type font.

12. In a telegraph printer, a type font having a neutral position and being movable angularly and rectilinearly from such neutral position, a first mechanism for imparting angular movement to said type font, a second mechanism for imparting rectilinear movement to said type font, each of said mechanisms comprising a lever arm which is oscillatable about a fixed axis, means for biasing said lever arm toward a definite normal position, means connecting said lever arm of said first mechanism to said type font to impart angular movement to said type font from its neutral position upon movement of such lever arm from its normal position, means connecting said lever arm of said second mechanism to said type font to impart rectilinear movement to the type font from its neutral position upon movement of the said lever arm of the second mechanism from its neutral position, a first group of solenoids positioned adjacent the lever arm of said first mechanism at different distances from the axis thereof, means for selectively energizing one only of said first group of solenoids to move said type font angularly in one direction or the other from its neutral position by an amount dependent on the one of said solenoids of said first group which is energized, a second group of solenoids positioned adjacent the lever arm of said second mechanism at different distances from the axis thereof, means for selectively energizing one only of the solenoids of said second group to move said type font rectilinearly in one direction or the other from its neutral position by an amount dependent on the one of said solenoids of said second group which is energized, and means for printing an alphabetical character corresponding to the angular and rectilinear orientation of said type font.

13. In a telegraph printer, a type font having a neutral position and being movable angularly and rectilinearly from such neutral position, a first mechanism for imparting angular movement to said type font in either direction from such neutral position, a second mechanism for imparting rectilinear movement to said type font in either direction from such neutral position, each of said mechanisms comprising a pair of lever arms which are independently oscillatable about fixed axes, means for biasing said lever arms toward definite normal positions of said arms, a pair of links pivotally connected to said lever arms at points spaced from the fixed axes thereof, said links being pivotally connected together by a pivot pin which occupies a definite neutral position when both said lever arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned adjacent the lever arms of said first mechanism, a portion of the solenoids of said first group being arranged to move one of the lever arms of said first mechanism by different amounts and the remainder of said solenoids of said first group being arranged to move the other of said lever arms of said first mechanism by different amounts, means for selectively energizing one only of said first group of solenoids to move said type font angularly in one direction or the other from its neutral position by an amount dependent on the one of said solenoids of said first group which is energized, a second group of solenoids positioned adjacent the lever arms of said second mechanism, a portion of said solenoids of said second group being arranged to move one of said lever arms of said second mechanism by different amounts and the remainder of said solenoids of said second group being arranged to move the other lever arm of said second mechanism by different amounts, and means for selectively energizing one only of the solenoids of said second group to move said type font rectilinearly in one direction or the other from its neutral position by an amount dependent on the one of said solenoids of said second group which is energized.

14. A telegraph printer for reception of alphabetical signals transmitted as permutations and combinations of a plurality of simultaneous audio frequency tones, said apparatus comprising an angularly and rectilinearly movable type font having a neutral position, a first mechanism for imparting angular movement to said type font, a second mechanism for imparting rectilinear movement to said type font, each of said mechanisms comprising a pair of arms which are independently oscillatable about fixed axes, means for biasing said arms toward definite normal positions thereof, a pair of links pivotally connected to said arms at points spaced from the fixed axes thereof, said links being pivotally connected together by a pivot pin which occupies a definite neutral position when both said arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of rotary solenoids positioned for engagement with the arms of said first mechanism at different distances from the axes thereof, first relay means responsive to permutations and combinations of at least two of said tones for selectively energizing one solenoid of said first group of solenoids to move said type font angularly in one direction or the other from its neutral position and by an amount dependent on the arm of said first mechanism which such energized solenoid engages and by the distance of such energized solenoid from the fixed axis of the engaged arm, a second group of solenoids positioned along the arms of said second mechanism at different distances from the axes thereof, second relay means responsive to permutations and combinations of the remaining of said tones for selectively energizing one of the solenoids of said second group to move said type font rectilinearly in one direction or the other from its neutral position and by an amount dependent on the arm of said second mechanism which such energized solenoid engages and by the distance of such energized solenoid from the engaged arm, and means for printing an alphabetical character corresponding to the angular and rectilinear orientation of said type font.

15. In a telegraph printer for reception of alphabetical signals transmitted as permutations and combinations of a plurality of simultaneous audio frequency tones, an angularly and rectilinearly movable type font having a neutral position, a first mechanism for imparting angular movement to said type font, a second mechanism for imparting rectilinear movement to said type font, each of said mechanisms comprising a pair of arms which are independently oscillatable about fixed axes, means for biasing said arms toward definite normal positions thereof, a pair of links pivotally connected to said arms at points spaced from the fixed axes thereof, said links being pivotally connected together by a pivot pin which occupies a definite neutral position when both said arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned adjacent the arms of said first mechanism at different distances from the axes thereof, first relay means responsive to permutations and combinations of certain of said tones for selectively energizing one only of said first group of solenoids to move said type font angularly in one direction or the other from its neutral position and by an amount dependent on the one of said solenoids of said first group which is energized, a second group of solenoids positioned adjacent the arms of said second mechanism at different distances from the axes thereof, second relay means responsive to permutations and combinations of certain other of said tones for selectively energizing one only of the solenoids of said second group to move said type font rectilinearly in one direction or the other from its neutral position and by an amount dependent on the one of said solenoids of said second group which is energized, and means for printing an alphabetical character corresponding to the angular and rectilinear orientation of said type font.

16. A telegraph printer for reception of alphabetical signals transmitted as permutations and combinations of a plurality of individual tones, said apparatus comprising an angularly and rectilinearly movable type font having a neutral position, a first mechanism for imparting angular movement to said type font, a second mechanism for imparting rectilinear movement to said type font, each of said mechanisms comprising a pair of arms which are independently oscillatable about fixed axes, means for biasing said arms toward definite normal positions thereof, a pair of links pivotally connected to said arms at points spaced from the fixed axes thereof, said links being pivotally connected together by a pivot pin which occupies a definite neutral position when both said arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned along the arms of said first mechanism at different distances from the axes thereof, first relay means responsive to permutations and combinations of certain of said tones for selectively energizing one of said first group of solenoids to move said type font angularly in one direction or the other from its neutral position by an amount dependent on the one of said solenoids of said first group which is energized, a second group of solenoids positioned along the arms of said second mechanism at different distances from the axes thereof, second relay means responsive to permutations and combinations of certain other of said tones for selectively energizing one of the solenoids of said second group to move said type font rectilinearly in one direction or the other from its neutral position by an amount dependent on the one of said solenoids of said second group which is energized, and means for printing an alphabetical character corresponding to the angular and rectilinear orientation of said type font, said biasing means for said arms causing said type font to return to its neutral position upon deenergization of the said solenoids of said first and second groups.

17. A telegraph printer for reception of alphabetical signals transmitted as permutations and combinations of a plurality of audio frequency tones, said apparatus comprising a rectilinearly movable type font having a neutral position, mechanism for imparting rectilinear movement to said type font comprising a pair of arms which are independently oscillatable about fixed axes, means for biasing said arms toward definite normal positions of said arms, a pair of links pivotally connected to said arms at points spaced from the fixed axes thereof, said links being pivotally connected together by a pivot pin which occupies a definite neutral position when both said arms are in their normal positions, means connecting said pivot pin of said mechanism to said type font to impart rectilinear movement to the type font from its neutral position upon movement of the said pivot pin from its neutral position, a group of solenoids positioned adjacent the arms of said mechanism at different distances from the axes thereof, relay means responsive to permutations and combinations of certain of said tones for selectively energizing one of said solenoids to move said type font rectilinearly in one direction or the other from its neutral position and by an amount dependent on the one of said solenoids which is energized, and means for printing an alphabetical character corresponding to the rectilinear orientation of said type font.

18. A telegraph printer for reception of alphabetical signals transmitted as permutations and combinations of a plurality of audio frequency tones, said apparatus comprising an angularly movable type font having a neutral position, mechanism for imparting angular movement to said type font comprising a pair of arms which are independently oscillatable about fixed axes, means for biasing said arms toward definite normal positions thereof, a pair of links pivotally connected to said arms at points spaced from the fixed axes thereof, said links being pivotally connected together by a pivot pin which occupies a definite neutral position when both said arms are in their normal positions, means connecting said pivot pin of said mechanism to said type font to impart angular movement to said type font from its neutral position upon movement of such pivot pin from its neutral position, a group of solenoids positioned adjacent the arms from its neutral position, a group of solenoids positioned adjacent the arms of said mechanism at different distances from the axes thereof, relay means responsive to permutations and combinations of a portion of said tones for selectively energizing one only of said solenoids to move said type font angularly in one direction or the other from its neutral position and by an amount dependent on the one of said solenoids which is energized, and means for printing an alphabetical character corresponding to the angular orientation of said type font.

19. A telegraph printer for reception of alphabetical signals transmitted as permutations and combinations of a plurality of simultaneous audio frequency tones, said apparatus comprising an angularly and rectilinearly movable type font having a neutral position, a first mechanism for imparting angular movement to said type font, a second mechanism for imparting rectilinear movement to said type font, each of said mechanisms comprising a pair of arms which are independently oscillatable about fixed axes, means for biasing said arms toward definite normal positions thereof, a pair of links pivotally connected to said arms at points spaced from the fixed axes thereof, said links being pivotally connected together by a pivot pin which occupies a definite neutral position when both said arms are in their normal positions, means connecting said pivot pin of said first mechanism to said type font to impart angular movement to said type font from its neutral position upon movement of such pivot pin from its neutral position, means connecting said pivot pin of said second mechanism to said type font to impart rectilinear movement to the type font from its neutral position upon movement of the said pivot pin of the second mechanism from its neutral position, a first group of solenoids positioned adjacent the arms of said first mechanism at different distances from the axes thereof, first relay means responsive to permutations and combinations of at least two of said tones for selectively energizing one only of said first groups of solenoids to move said type font angularly in one direction or the other from its neutral position by an amount dependent on the one of said solenoids of said first group which is energized, a second group of solenoids positioned adjacent the arms of said second mechanism at different distances from the axes thereof, second relay means responsive to permutations and combinations of the remaining of said tones for selectively energizing one only of the solenoids of said second group to move said type font rectilinearly in one direction or the other from its neutral position by an amount dependent on the one of said solenoids of said second group which is energized, the energization of the solenoid of said first group and of the solenoid of said second group taking place substantially simultaneously to thereby impart substantially simultaneous angular and rectilinear motion to said type font, and means for printing an alphabetical character corresponding to the angular and rectilinear orientation of said type font.

References Cited in the file of this patent

UNITED STATES PATENTS

| | | |
|---|---|---|
| Re. 20,330 | Morton | Apr. 13, 1937 |
| 267,367 | Pratt | Nov. 14, 1882 |
| 486,889 | Neal et al. | Nov. 29, 1892 |
| 748,970 | Michael | Jan. 5, 1904 |
| 865,470 | Wright | Sept. 10, 1907 |
| 1,814,236 | Wusteney | July 14, 1931 |
| 1,974,307 | Griffith | Sept. 18, 1934 |
| 2,339,313 | Zenner | Jan. 18, 1944 |
| 2,340,804 | Fitch et al. | Feb. 1, 1944 |